(12) United States Patent
Irani et al.

(10) Patent No.: US 7,428,019 B2
(45) Date of Patent: Sep. 23, 2008

(54) SYSTEM AND METHOD FOR INCREASING SPACE OR TIME RESOLUTION IN VIDEO

(75) Inventors: Michal Irani, Rehovot (IL); Yaron Caspi, Nes Ziona (IL); Eli Shechtman, Rehovot (IL)

(73) Assignee: Yeda Research And Development Co. Ltd., Rechovot (IL)

( * ) Notice: Subject to any disclaimer, the term of this patent is extended or adjusted under 35 U.S.C. 154(b) by 0 days.

(21) Appl. No.: 10/498,345

(22) PCT Filed: Dec. 26, 2002

(86) PCT No.: PCT/IL02/01039

§ 371 (c)(1),
(2), (4) Date: Jun. 17, 2004

(87) PCT Pub. No.: WO03/060823

PCT Pub. Date: Jul. 24, 2003

(65) Prior Publication Data

US 2005/0057687 A1    Mar. 17, 2005

(51) Int. Cl.
*H04N 5/262* (2006.01)
*H04N 5/225* (2006.01)

(52) U.S. Cl. .................. 348/581; 348/598; 348/561; 348/584; 348/218.1; 348/222.1; 348/208.13; 348/221.1; 382/284; 382/299

(58) Field of Classification Search .............. 348/584, 348/581, 561, 704, 208.13, 222.1, 63, 153, 348/159, 441, 445, 699, 700, 598, 154, 218.1, 348/701, 155, 452, 627, 607, 221.1; 382/299, 382/298, 284; 386/117, 107
See application file for complete search history.

(56) References Cited

U.S. PATENT DOCUMENTS

| | | | | |
|---|---|---|---|---|
| 4,652,909 A | * | 3/1987 | Glenn | 348/262 |
| 4,685,002 A | * | 8/1987 | Powers | 386/109 |
| 4,785,323 A | * | 11/1988 | Bell | 396/89 |
| 4,797,942 A | * | 1/1989 | Burt | 382/284 |
| 4,947,260 A | * | 8/1990 | Reed et al. | 358/447 |
| 5,392,071 A | * | 2/1995 | Richards et al. | 375/240.11 |

(Continued)

OTHER PUBLICATIONS

Borman et al. "Spatial Resolution Enhancement of Low-Resolution Image Sequences. A Comprehensive Review With Directions for Future Research", Technical Report, Laboratory for Image and Signal Analysis (LISA), University of Notre Dame, In., USA, 1998.

(Continued)

*Primary Examiner*—Tuan Ho
*Assistant Examiner*—Jean W. Désir

(57) ABSTRACT

A system and method for increasing space or time resolution of an image sequence by combination of a plurality input sources with different space-time resolutions such that the single output displays increased accuracy and clarity without the calculation of motion vectors. This system of enhancement may be used on any optical recording device, including but not limited to digital video, analog video, still pictures of any format and so forth. The present invention includes support for example for such features as single frame resolution increase, combination of a number of still pictures, the option to calibrate spatial or temporal enhancement or any combination thereof, increased video resolution by using high-resolution still cameras as enhancement additions and may optionally be implemented using a camera synchronization method.

47 Claims, 13 Drawing Sheets

U.S. PATENT DOCUMENTS

| | | | | |
|---|---|---|---|---|
| 5,444,483 | A * | 8/1995 | Maeda | 348/231.6 |
| 5,523,786 | A * | 6/1996 | Parulski | 348/269 |
| 5,668,595 | A * | 9/1997 | Katayama et al. | 348/218.1 |
| 5,689,302 | A * | 11/1997 | Jones | 348/218.1 |
| 5,694,165 | A * | 12/1997 | Yamazaki et al. | 348/218.1 |
| 5,696,848 | A * | 12/1997 | Patti et al. | 382/254 |
| 5,757,423 | A * | 5/1998 | Tanaka et al. | 348/218.1 |
| 5,764,285 | A * | 6/1998 | Ochi et al. | 348/222.1 |
| 5,798,798 | A * | 8/1998 | Rector et al. | 348/476 |
| 5,920,657 | A * | 7/1999 | Bender et al. | 382/284 |
| 5,982,452 | A * | 11/1999 | Gregson et al. | 348/584 |
| 5,982,941 | A * | 11/1999 | Loveridge et al. | 382/260 |
| 5,988,863 | A * | 11/1999 | Demos | 708/203 |
| 6,002,794 | A * | 12/1999 | Bonneau et al. | 382/166 |
| 6,023,535 | A * | 2/2000 | Aoki | 382/299 |
| 6,128,416 | A * | 10/2000 | Oura | 382/284 |
| 6,211,911 | B1 * | 4/2001 | Komiya et al. | 348/218.1 |
| 6,249,616 | B1 * | 6/2001 | Hashimoto | 382/284 |
| 6,269,175 | B1 * | 7/2001 | Hanna et al. | 382/107 |
| 6,285,804 | B1 * | 9/2001 | Crinon et al. | 382/299 |
| 6,411,339 | B1 * | 6/2002 | Akutsu et al. | 348/584 |
| 6,456,335 | B1 * | 9/2002 | Miura et al. | 348/588 |
| 6,466,618 | B1 * | 10/2002 | Messing et al. | 375/240.01 |
| 6,490,364 | B2 * | 12/2002 | Hanna et al. | 382/107 |
| 6,535,650 | B1 * | 3/2003 | Poulo et al. | 382/284 |
| 6,570,613 | B1 * | 5/2003 | Howell | 348/219.1 |
| 6,639,626 | B1 * | 10/2003 | Kubo et al. | 348/218.1 |
| 6,728,317 | B1 * | 4/2004 | Demos | 375/240.21 |
| 6,734,896 | B2 * | 5/2004 | Nobori et al. | 348/148 |
| 6,995,790 | B2 * | 2/2006 | Higurashi et al. | 348/218.1 |
| 7,015,954 | B1 * | 3/2006 | Foote et al. | 348/218.1 |
| 7,123,780 | B2 * | 10/2006 | Carrig | 382/299 |
| 7,149,262 | B1 * | 12/2006 | Nayar et al. | 375/341 |
| 2004/0071367 | A1 * | 4/2004 | Irani et al. | 382/284 |

OTHER PUBLICATIONS

Irani et al. "Improving Resolution by Image Registration", CVGIP: Graphical Models and Image Processing, 53(3): 231-239, 1991.

Patti et al. "Superresolution Video Reconstruction With Arbitrary Sampling Lattices and Nonzero Aperture Time", IEEE Transaction on Image Processing, 6(8): 1064-1076, 1997.

Capel et al. "Super-Resolution Enhancement of Text Image Sequences", ICPR, p. 600-605, 2000.

Greenspan et al. "MRI Inter-Slice Reconstruction Using Super-Resolution", 2001.

Bascle et al. "Motion Deblurring and Super-Resolution From An Image Sequence", ECCV, p. 573-581, 1996.

* cited by examiner

SYSTEM AND METHOD FOR INCREASING SPACE OR TIME RESOLUTION IN VIDEO

FIELD OF THE INVENTION

The present invention relates to a system and method for the increase of space or time resolution by a combination of multiple input sources with different space-time resolutions such that the single output displays increased accuracy and clarity.

BACKGROUND OF THE INVENTION

In the field of video image capture, a continuous scene in space and time is converted into an electronic set of information best described as a grid of discrete picture elements each having a number of properties including color, brightness and location (x, y) on the grid. Hereinafter the grid is referred to as a raster image and the picture elements as pixels. A raster of pixels is referred to as a frame, and a video stream is hereinafter defined as a series of frames such that when they are displayed rapidly in succession they create the illusion of a moving image—which method forms the basis of digital video and is well-known in the art.

Different formats of video may have different spatial resolutions for example NTSC has 640×480 pixels and PAL has 768×576 and so forth. These factors limit the size or spatial features of objects that can be visually detected in an image. These limitations apply as well to the art of still image photography.

In the art of video photography the issue of resolution is further affected by the rate at which bitmap images may be captured by the camera—the frame rate, which is defined hereinafter as the rate at which discrete bitmaps are generated by the camera. The frame-rate is limiting the temporal resolution of the video image. Different formats of video may have different temporal resolutions for example NTSC has 30 frames per second and PAL has 25 and so forth.

Limitations in temporal and spatial resolution of images create perception errors in the illusion of sight created by the display of bitmap images as a video stream. Rapid dynamic events which occur faster than the frame-rate of video cameras are not visible or else captured incorrectly in the recorded video sequences. This problem is often evident in sports videos where it is impossible to see the full motion or the behavior of a fast-moving ball, for example.

There are two typical visual effects in video sequences caused by very fast motion. The most common of which is motion blur, which is caused by the exposure-time of the camera. The camera integrates light coming from the scene for the entire length of the exposure time to generate a frame (bitmap image.) As a result of motion during this exposure time, fast-moving objects produce a noted blur along their trajectory, often resulting in distorted or unrecognizable object shapes. The faster the movement of the object, the stronger this effect is found to be.

Previous methods for reducing motion-blur in the art require prior segmentation of moving objects and the estimation of their motions. Such motion analysis may be impossible in the presence of severe shape distortions or is meaningless for reducing motion-blur in the presence of motion aliasing. There is thus an unmet need for a system and method to increase the temporal resolution of video streams using information from multiple video sequences without the need to separate static and dynamic scene components or estimate their motions.

The second visual effect caused by the frame-rate of the camera is a temporal phenomenon referred to as motion aliasing. Motion-based (temporal) aliasing occurs when the trajectory generated by a fast moving object is characterized by a frequency greater than the frame-rate of the camera. When this happens, the high temporal frequencies are "folded" into the low temporal frequencies resulting in a distorted or even false trajectory of the moving object. This effect is best illustrated in a phenomenon known as the "wagon wheel effect" which is well-known in the art, where a wheel rotates at a high frequency, but beyond a certain speed it appears to be rotating in the wrong direction or even not to be rotating.

Playing a video suffering from motion aliasing in slow motion does not remedy the phenomenon, even when this is done using all of the sophisticated temporal interpolations to increase frame-rate which exist in the art. This is because the information contained in a single video sequence is insufficient to recover the missing information of very fast dynamic events due to the slow and mistimed sampling and the blur.

Traditional spatial super-resolution in the art is image-based and only spatial. Methods exist for increasing the spatial resolution of images by the combination of information from a plurality of low-resolution images obtained at sub-pixel displacements. These however assume static scenes and do not address the limited temporal resolution observed in dynamic scenes. While spatial and temporal resolution are different in nature, they remain inter-related in the field of video, and this creates the option of tradeoffs being made between space and time. There is as yet no super-resolution system available in the art which enables generation of different output-sequence resolutions for the same set of input sequences where a large increase in temporal resolution may be made at the expense of spatial clarity, or vice versa.

Known image-based methods in the art become even less useful with the advent of inputs of differing space-time resolutions. In traditional image-based super-resolution there is no incentive to combine input images of different resolution since a high-resolution image subsumes the information contained in a low resolutions image. This aggravates the need in the industry for a system and method which is able to utilize the complementary information provided by different cameras, being able to combine the information obtained by high-quality still cameras (with very high spatial resolution), with information obtained by video cameras (which have low spatial resolution, but high temporal resolution) to create an improved video sequence of high spatial and temporal resolution.

SUMMARY OF THE INVENTION

There is an unmet need for, and it would be highly useful to have, a system and method for increasing space and/or time resolution by combination of a plurality input sources with different space-time resolutions such that the single output displays increased accuracy and clarity without the calculation of motion vectors.

According to the preferred embodiments of the present invention a plurality of low resolution video data streams of a scene are combined in order to increase their temporal, spatial or temporal and spatial resolution. Resolution may optionally be increased to a varying degree in both space and time, and optionally more in one than in the other. According to one embodiment of the present invention resolution in time may be increased at the expense of resolution in space and vice versa to create a newly devised stream of higher quality.

According to the preferred embodiments of the present invention these cameras are preferably in close physical proximity to one another and the plurality of low resolution video data streams are combined into a single higher resolution video data stream which is characterized by having a higher sampling rate than any of the original input streams in at least one of space or time. The low resolution data streams may optionally and preferably be of different space-time resolutions, and most preferably include data from at least two of NTSC, PAL, HDTV, SECAM, other video formats or still images.

According to the preferred embodiments of the present invention a required minimum number of low resolution video streams may be calculated in order to achieve a desired increase in resolution. Additionally the transformation may optionally be determined in at least one of space or time for the super-resolution.

According to the preferred embodiments of the present invention spatial and temporal coordinates are calculated for each of the two or more low resolution video streams and alignment between at least one of the spatial and temporal coordinates is created in order to effect the super-resolution, optionally by adjustment where necessary. Where the adjustment is temporal it may optionally be enacted by a one-dimensional affine transformation in time. Where the adjustment is spatial, it may optionally be enacted by location of a relative physical location for each source and then adjusting the spatial coordinates according to the relative locations. The relative physical location of each source, such as for each camera for example, is optionally obtained in a pre-calibration process.

A calibration factor may optionally be determined for each factor and spatial coordinates may be adjusted in accordance with this factor.

According to the preferred embodiments of the present invention a kernel for convoluting data from the video sources is optionally provided, which kernel may optionally include regional kernels for separate portions of the data.

According to the preferred embodiments of the present invention the discretization optionally comprises the equation $$S_i^l(p_i^l) = (S * B_i^h)(p^h) = \int_x \int_y \int_t S(p) B_i^h(p - p^h) dp$$
$$p=(x,y,t) \in Support(B_i^h)$$

which is optionally discretized by at least one of an isotropic or non-isotropic discretization. Video information from the plurality of low-resolution video streams contains measurements, each of which represents a space-time point, to which the above discretization is optionally applied according to $A\vec{h} = \vec{l}$ where $\vec{h}$ is a vector containing color values for the video data with the adjusted resolution and $\vec{l}$ is a vector containing spatial and temporal measurements. Matrix A optionally has the relative contributions of each known space-time point from the at least two low-resolution cameras upon which the transformation is optionally enacted.

According to the preferred embodiments of the present invention, the space-time regularization term may further comprise a directional regularization term $$\min(\|A\vec{h} - \vec{l}\|^2 + \|W_x L_x \vec{h}\|^2 + \|W_y L_y \vec{h}\|^2 + \|W_t L_t \vec{h}\|^2)$$

According to the preferred embodiments of the present invention the dynamic range of the pixels in the output stream may optionally be larger than that of the input sequences.

The present invention may be described as a mathematical model having dynamic space-time scene S. $\{S_i^l\}_{i=1}^n$ is a set of video sequences of the dynamic scene recorded by two or more video cameras, each having limited spatial and temporal resolution. This limited resolution is due to the space-time imaging process, which can be thought of as a process of blurring followed by sampling in time and space.

The blurring effect results from the fact that the color at each pixel in each frame is an integral of the color is in a space-time region in the dynamic scene S. This integral has a fixed, discrete number over the entire region of the single pixel, where in reality there may be discrepancies over the pixel, hence a pixel is a discretization of a region of space-time. The temporal extent of this region is determined by the exposure time of the video camera, and the spatial extent of this region is determined by the spatial point spread function of the camera, determined by the properties of the lens and detectors.

Video sequences recorded by two or more video cameras are combined to construct a sequence $S^h$ of high space-time resolution. Such a sequence optionally has a smaller blurring effects and or finer sampling optionally in space, time or any calibrated combination of the two, having the benefit of capturing fine spatial features from the scene or rapid dynamic events which cannot be captured by low resolution sequences.

Optionally and preferably a plurality of high-resolution sequences $S^h$ may be generated with spatial and temporal sampling rates (discretization) of the space-time volume differing in space and time. Thus the present invention may optionally produce a video sequence $S^h$ having very high spatial resolution but low temporal resolution, a sequence $S^h$ having high temporal resolution but low spatial resolution, or any optional combination of the two.

The space-time resolution of each of the video sequences recorded by two or more video cameras is determined by the blur and sub sampling of the camera. These have different characteristics in time and space. The temporal blur induced by the exposure time has the shape of a rectangular kernel which is generally smaller than a single frame time (τ<frame-time) while spatial blur has a Gaussian shape with the radius of a few pixels (σ>1 pixel). The present invention thus contains a higher upper bound on the obtainable temporal resolution than on the obtainable spatial resolution, i.e. the number of sequences that can effectively contribute to the temporal resolution improvements is larger for temporal resolution improvements than for spatial resolution improvements. A known disadvantage of a rectangular shape of the temporal blur is the ringing effect where objects are given a false halo effect, which is controlled by the regularization.

According to the preferred embodiments of the present invention, a new video sequence $S_i^l$ whose axes are aligned with those of the continuous space-time volume of the desired scene is created. $S^h$ is thus mathematically a discretization of S with a higher sampling rate than $S_i^l$. The function of the present invention is thus to model the transformation $T_1$ from the space-time coordinate system of $S_i^l$ to the space-time coordinate system of $S^h$ by a scaling transformation in space or time.

Hereinafter, the term "enhance" with regard to resolution includes increasing resolution relative to at least one dimension of at least one input, such that at least a portion of a plurality of space-time points of the at least one input is not identical to the space-time points of at least one other input.

Hereinafter, the term "super-resolution" includes increasing resolution relative to at least one dimension of all inputs.

Hereinafter, the term "contrast" may include one or more of color resolution, gray-scale resolution and dynamic range.

It should be noted that the present invention is operable with any data of sequences of images and/or any source of such data, such as sequence of images cameras for example. A preferred but non-limiting example, as described in greater detail below, is video data as the sequence of images data, and/or video cameras as the sequence of images cameras.

The ability to combine information from data sources with different space-time resolutions leads to some new applications in the field of image/video cameras and new imaging sensors for video cameras. New cameras may optionally be built with several sensors of same or different space-time resolutions, where the output sequence can have higher temporal and/or spatial resolution than any of the individual sensors. Similar principles may optionally be used to create new designs for individual imaging sensors, where the ability to control the frame-rate and exposure-time of different groups of detectors and the usage of the suggested algorithm, may lead to high quality (possibly with temporal super-resolution) output video sequences, that are operable with fewer bits of data, through on-sensor compression.

BRIEF DESCRIPTION OF THE DRAWINGS

The invention is herein described, by way of example only, with reference to the accompanying drawings, wherein.

DESCRIPTION OF THE PREFERRED EMBODIMENTS

Figure 1:
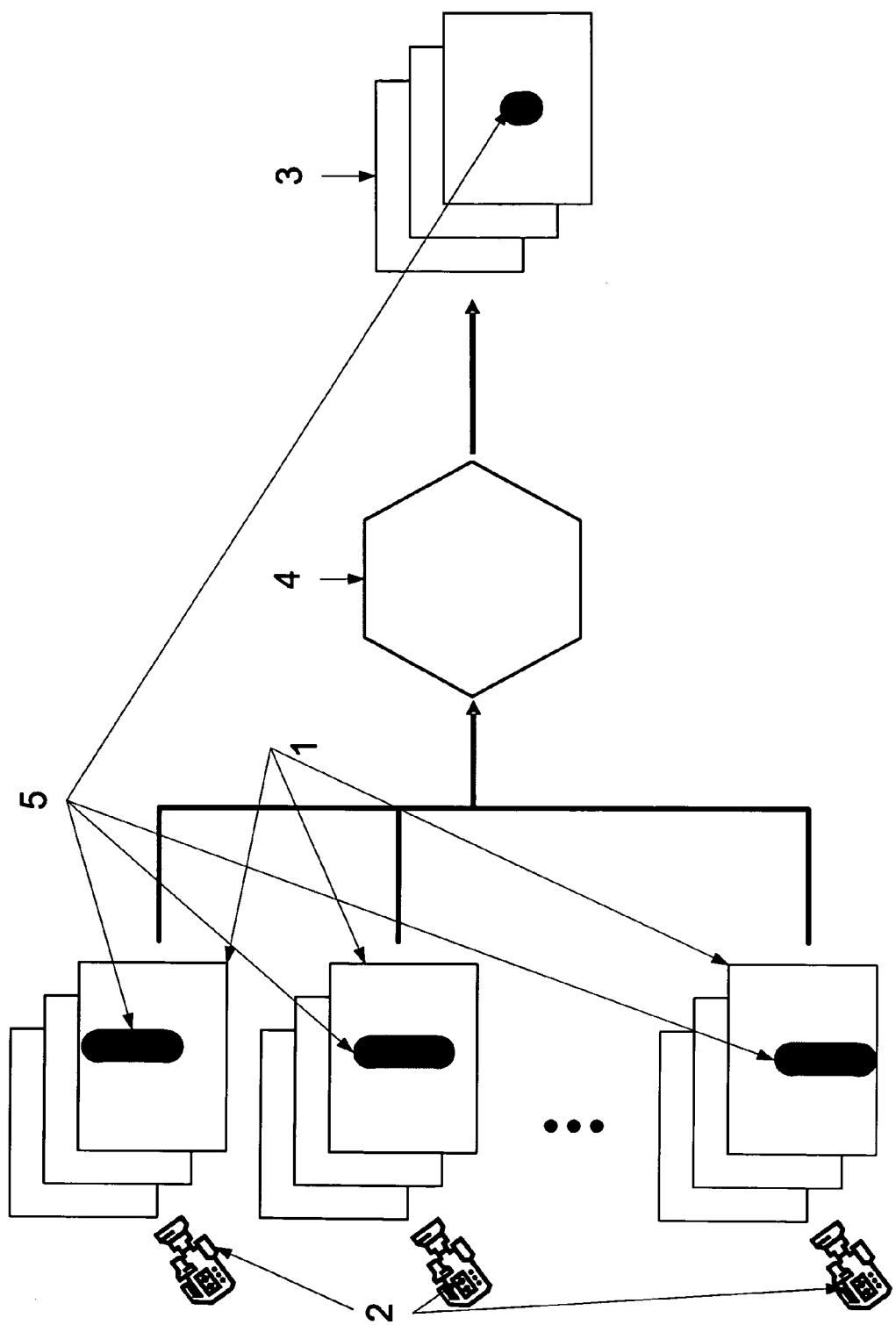
FIG. 1 is a system diagram of an exemplary system according to the present invention.

The present invention provides a unified framework for increasing he resolution both in space and in time of a space-time visual entity, including but not limited to a still image, a sequence of images, a video recording, a stream of data from a detector, a stream of data from an array of detectors arranged on a single sensor, a combination thereof and so forth. The increased resolution a space-time visual entity is created by combining information from multiple video sequences of dynamic scenes obtained at a plurality of sub-pixel spatial and sub-frame temporal misalignments. This spatiotemporal super-resolution reduces a number of effects, including but not limited to spatial blur, spatial artifacts, motion blur, motion aliasing and so forth.

According to the preferred embodiments of the present invention a plurality of low resolution video data streams of a scene are combined in order to increase their temporal, spatial or temporal and spatial resolution. Resolution may optionally be increased to a varying degree in both space and time, optionally more in one than in the other, and optionally in one at the proportional expense of another. According to one embodiment of the present invention resolution in time may be increased at the expense of resolution in space and vice versa. According to another embodiment of the present invention, cameras are deliberately misaligned at either sub-frame or sub-pixel misalignments, or both. These misalignments may optionally be predetermined, optionally according to the number of devices.

However, alternatively a relative temporal order for this plurality of video cameras is provided and/or determined or obtained for increasing the temporal resolution.

According to the preferred embodiments of the present invention if there is an optional plurality of video cameras which are preferably in close physical proximity to one another and the plurality of low resolution video data streams are combined into a single higher resolution video data stream which is characterized by having a higher sampling rate than any of the original input streams in at least one of space or time. In the event that the input streams emerge from sources this may be overcome if a proper alignment and/or correspondence method is used and the point-wise space-time transformations between the sources are known and can be added in the algorithms listed below. The low resolution data streams may optionally and may be of different space-time resolutions, and may include data from at least two of the following data sources: NTSC, PAL, HDTV, SECAM, other video formats or still images.

According to the preferred embodiments of the present invention a required minimum number of low resolution video streams may be calculated in order to achieve a desired increase in resolution. Additionally the transformation is determined in space and time at sub-pixel and sub-frame accuracy for the super-resolution after determining a relative physical location of the video. These are examples of sub-units, in which each space-time visual entity comprises at least one unit, and each unit comprises a plurality of sub-units. Therefore, the plurality of space-time visual entities may optionally be misaligned at a sub-unit level, such that combining information, for example through a transformation, is optionally performed according to a sub-unit misalignment. The sub-unit misalignment may optionally comprise one or both of spatial and/or temporal misalignment. Also, the sub-unit misalignment may optionally be predetermined, or alternatively may be recovered from the data. The sub-units themselves may optionally comprise sub-pixel data, and/or at least one of sub-frame or inter-frame units.

The spatial point spread functions, which may optionally vary along the field of view of the various space-time visual entities, may optionally be approximated according to a predetermined heuristic, a real-time calculation.

The temporal resolution as well may vary between space-time visual entities. The temporal resolution may optionally be known in advance, determined by controlling the exposure time, approximated according to emerging data and so forth.

According to the preferred embodiments of the present invention spatial and temporal coordinate transformations are calculated between each of the two or more low resolution video streams and alignment between at least one of the spatial and temporal coordinates is created in order to effect the super-resolution, optionally by adjustment where necessary, optionally by warping as discussed below. Where the adjustment is temporal it may optionally be enacted by a one-dimensional affine transformation in time. Where the misalignment is spatial, it may optionally be adjusted by location of a relative physical location for each source and then adjusting the spatial coordinates according to the relative locations. In the optional event that cameras are in close physical proximity to one another, this adjustment may then optionally be expressed as a 2D homography. In the optional event that cameras are not in close physical proximity to one another, the adjustment is preferably then performed as a 3D transformation. A calibration adjustment such as scaling for example may optionally be determined from the relative location (reference input sequence coordinates) to the output location (output sequence coordinates) and spatial coordinates may be adjusted in accordance with this calibration adjustment. Spatial misalignment recovery may also optionally be performed easily (or completely avoided) through the use of a single camera with joint optics. Published US Patent Application No. 20020094135, filed on May 10, 2001, owned in common with the present application and having at least one common inventor, and hereby incorporated by reference as if fully set forth herein, describes a method for misalignment recovery for a spatial and/or temporal misalignment by determining a correct alignment from the actual video data. This method may also optionally be used in conjunction with the present invention.

According to the preferred embodiments of the present invention a kernel for convoluting data from the video sources is optionally provided, where the kernel may optionally include regional kernels for separate portions of the data.

The preferred embodiments of the present invention optionally comprises the equation $$S_i^l(p_i^l) = (S * B_i^h)(p^h) = \iiint\limits_{\substack{p=(x,y,t)\in Support(B_i^h)}} S(p)B_i^h(p - p^h)dp$$

which is optionally discretized by at least one of an isotropic or non-isotropic discretization. Video information from the plurality of low-resolution video streams contains measurements, each of which represents a space-time point, to which the above discretization is optionally applied according to $A\vec{h} = \vec{l}$ (equation 2) where $\vec{h}$ is a vector containing color values for the video data with the adjusted resolution and $\vec{l}$ is a vector containing spatial and temporal measurements. Matrix A optionally has the relative contributions of each known space-time point from the at least two low-resolution cameras upon which the transformation is optionally enacted.

According to the preferred embodiments of the present invention, the space-time regularization term may further comprise a directional regularization term $$\min\left(\|A\vec{h} - \vec{l}\|^2 + \|W_x L_x \vec{h}\|^2 + \|W_y L_y \vec{h}\|^2 + \|W_t L_t \vec{h}\|^2\right)$$

which adds a preference for a smooth solution to the above equation, optionally along a main axis, or optionally along diagonals, and having a low second derivative.

This regularization term may optionally be weighted with at least one weight, according to characteristics of the data from the various video entities, optionally according to first or second derivatives of the video data (or sequences of images). This weight may be determined according to data from the plurality of sources of sequences of images, for example from a plurality of sources of video data. If the equations are solved iteratively, the weight may optionally be determined from a previous iteration.

Super-resolution may also optionally take place regarding the optical characteristic of contrast. In such super-resolution a number of characteristics of the space-time visual entity are improved or aligned including but not limited to color resolution, gray-scale resolution, dynamic range and so forth. For example, the contrast may optionally be adjusted by adjusting the dynamic range. The dynamic range may, in turn, optionally be adjusted by increasing the number of bits per image element.

In the event that the equation is solved iteratively, the weight may be determined from a previous iteration.

The principles and operation of the present invention may be better understood with reference to the drawings and the accompanying description.

Figure 1A:
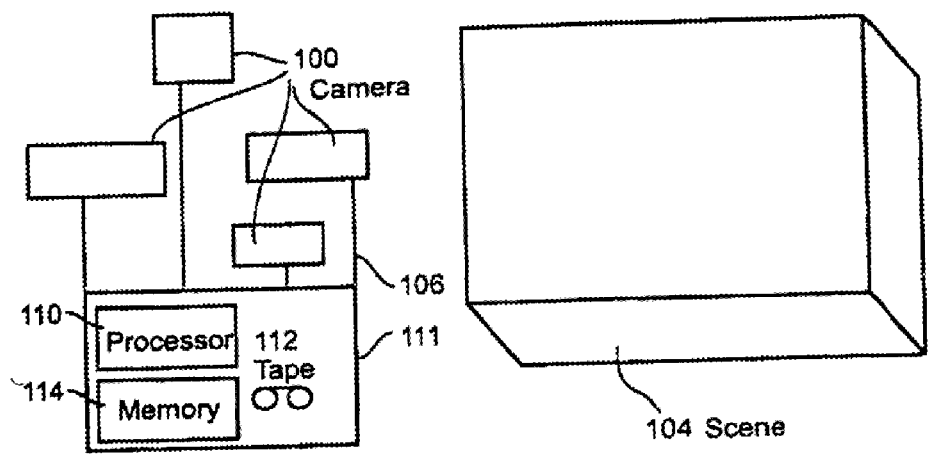

Referring to the drawings, FIG. 1a is a system diagram of an exemplary system according to the present invention wherein a plurality of at least two low-resolution video cameras 100 is connected via cables 106 to an exemplary recording apparatus 111. Apparatus 111 optionally and preferably contains a processor 110, memory 114 and an exemplary long-term storage medium 112, the latter of which is illustrated by a tape without any intention of being limiting in any way. The system records the events of an actual space-time scene 104.

Figure 1B:
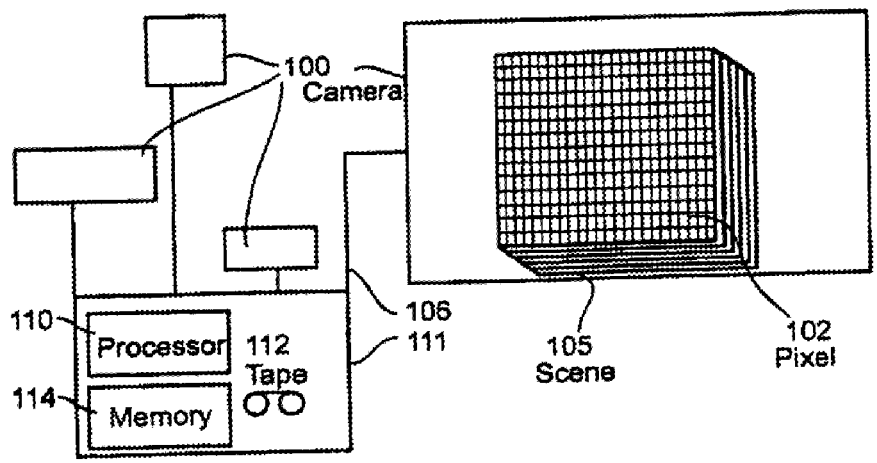
Figure 2:
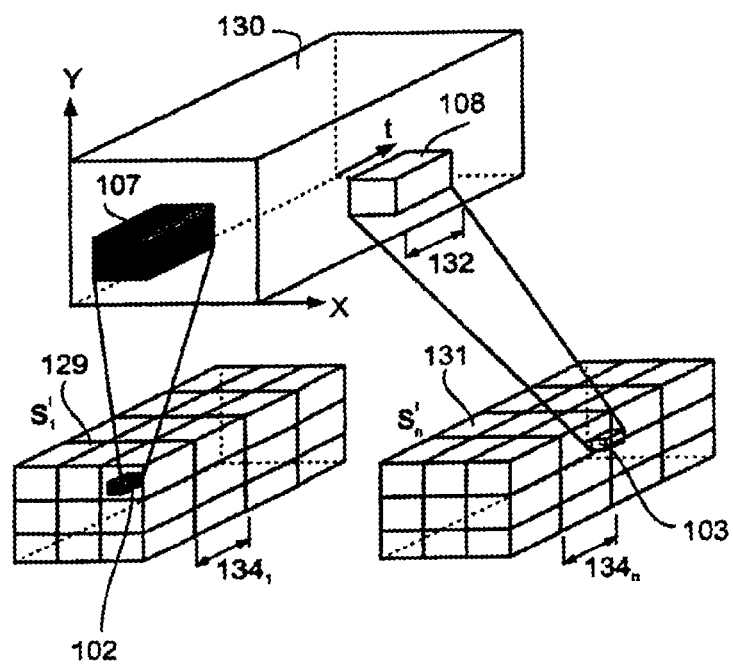

In FIG. 1b one of the at least two low-resolution video cameras 100 has been expanded to display data of the representation of scene 104 within the relevant components of camera 100. Data obtained from recording scene 104 is captured within the apparatus of video camera 100 as a three-dimensional sequence 105 of picture elements (pixels 102) each having a number of properties including color, brightness and location and time (x,y,t) on the space-time grid. In FIG. 1b, the continuous space-time volume of scene 104 from FIG. 1a is discretized into distinct blocks in space and time, i.e. is cut into discrete uniform space-time blocks that are represented by the intensity values of the video frame pixels. These discrete blocks are rectangular in time and space—they have rigid borders and a specific instant when they are changed according to the sampling rate (frames per second) and are thus described as a discretization of data of the recording of scene 104. The present invention relates to a system and method of reshaping these discretized blocks into smaller, more accurate and higher frequency discretizations of scene 104 in order to improve the realism of the final result.

Figure 2:
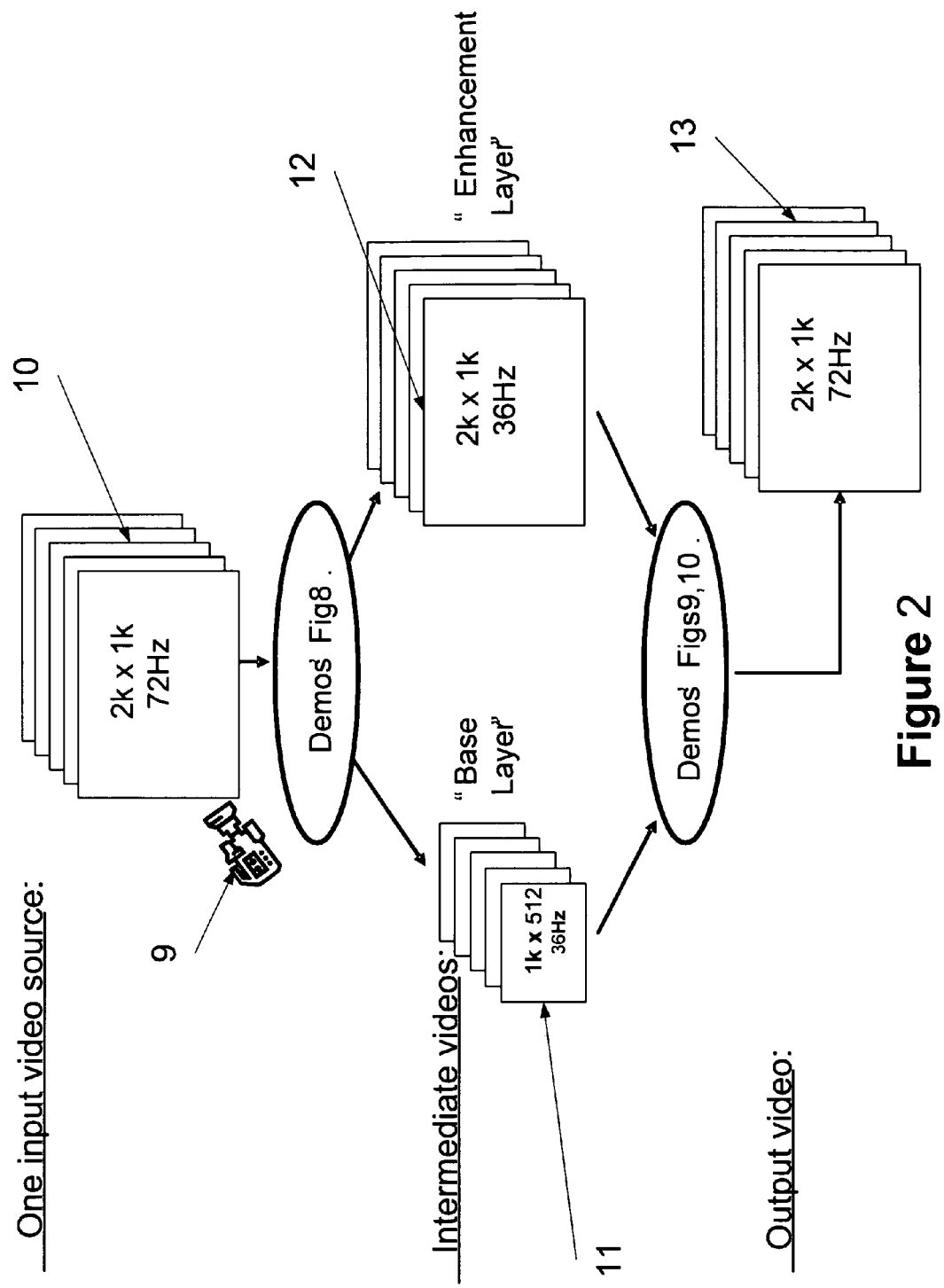
FIG. 2 is a schematic block diagram of an exemplary system according to the present invention.

FIG. 2 shows an expanded segment 130 of scene 104, which has been expanded in order to clarify the process by which realism is lost in the digitizing process. Sequence 129 ($S_i^l$) is an input sequence from a single camera or source with its own discretization of scene. The small space-time blocks 102 and 103 inside Sequences 129-131 ($S_i^l$ . . . $S_n^i$) correspond to pixel values of frames inside these input sequences, these values represent the continuous intensities of scene 130 that are depicted by the areas of space (pixels' support volumes) 107 and 108. The typical shape of support volumes 107 and 108 is Gaussian in the x,y dimensions and rectangular in the time dimension. Within space 130, volumes 107 and 108 are clearly visible, but their duration in time 132 (the exposure-time of the camera) differs from that of their corresponding pixels 102 and 103 whose sampling time interval is 134 (the frame-time of the camera).

Figure 3:
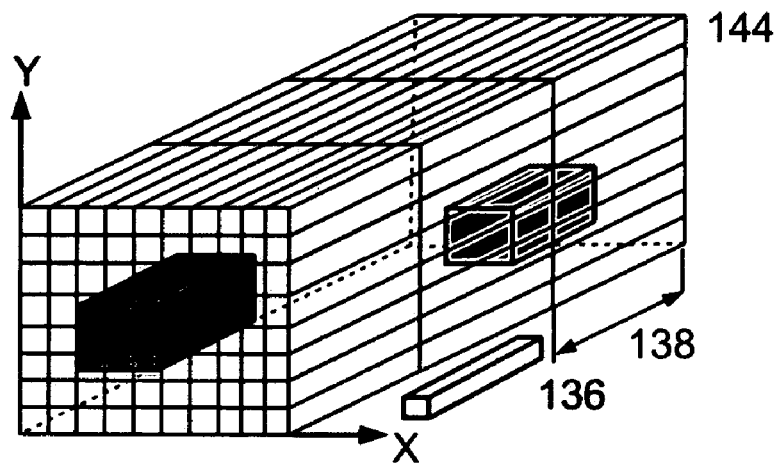
FIG. 3 is an alternative schematic block diagram of an exemplary system according to the present invention.
Figure 3:
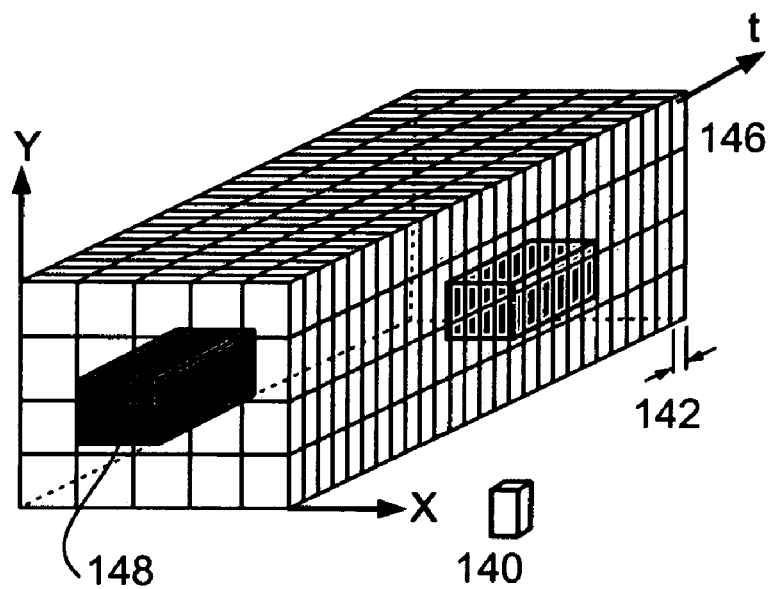

In FIG. 3 two new discretizations of area 130 are shown. Instead of mapping duration 134 to a similar duration, duration 134 is mapped onto durations 138 and 142 which are clearly very different. The same is done to the x and y size of the space—they are mapped onto incompatible x and y grids 144 and 146, leaving visible sub-pixel sized sample areas 148 which must be dealt with. High resolution pixels 136/140 are also shown.

Dealing with this incompatibility between the matrices may be modeled mathematically, letting $T_{i=1}$ denote the space-time coordinate transformation from the reference sequence $S_i^l$ to the i-th low resolutions sequence, such that the space-time coordinate transformation of each low resolutions sequence $S_i^l$ is related to that of high-resolution sequence $S^h$ by $T_{i=T_i}$, $T_{i \to 1}$. Transformations are optionally computed for all pairs of input sequences $T_{i \to j} \forall_{i,j}$ instead of constructing $T_1$ using $T_{i=1}$ if transformations, thereby enabling us to apply "bundle adjustments" to determine all coordinate transformations $T_{i \to reference}$ more accurately.

The need for a space-time coordinate transformation between the two input sequences $T_{i=1}$ is a result of the different settings of the two or more cameras. A temporal misalignment between the two or more sequences occurs when there is a time shift or offset between them for example because the cameras were not activated simultaneously, they have different frame rates (e.g. PAL and NTSC), different internal and external calibration parameters and so forth. These different functional characteristics of the cameras may result in temporal misalignments. Temporal misalignment between sequences may optionally be controlled by the use of synchronization hardware. Such hardware may preferably perform phase shifts between sampling times of a plurality of sequence of images cameras and is needed in order to perform temporal super-resolution.

According to the preferred embodiments of the present invention such temporal misalignments can be modeled by a one-dimensional affine transformation in time, most preferably at sub frame time units i.e. having computation carried out mainly on vectors between points, and sparsely on points themselves. When the camera centers are preferably close together, or the scene is planar, spatial transformation may optionally be modeled by an inter-camera homography, an approach enabling the spatial and temporal alignment of two sequences even when there is no common spatial information between the sequences, made possible by replacing the need for coherent appearance which is a fundamental requirement in standard images alignment techniques, with the requirement of coherent temporal behavior which may optionally be easier to satisfy.

According to the preferred embodiments of the present invention, blur in space and time is reduced by the combination of input from at least two video sources. The exposure time 132 of i-th low resolution camera 100 which causes such temporal blurring in the low resolution sequence $S_i^l$ is optionally presented by $\tau_i$, while the point spread function the i-th low resolution camera which causes spatial blur in the low resolutions sequence $S_i^l$ is approximated by a two-dimensional spatial Gaussian with a standard deviation $\sigma_i$. The combined space-time blur of the i-th low resolution camera is optionally denoted by $B_1 - B_{(\sigma_i, \tau_i, P_i^l)}$ corresponding to the low resolution space-time point $P_i^l = (x_i^l, y_i^l, t_i^l)$. High-resolution space-time point 136 is optionally defined as $P^h = (x_i^h, y_i^h, t^h)$ and optionally corresponds to $P^h_{=T_i}(P_i^l)$. $P^h$ is optionally an integer grid point of $S^h$, but may optionally lie at any point contained in continuous space-time volume S (130).

According to the preferred embodiments of the present invention the relation between the unknown space-time values $S(P^h)$ and unknown low resolution space-time measurement $S_i^l(P_i^l)$ is most preferably expressed by linear equation $$S_i^l(p_i^l) = (S * B_i^h)(p^h) = \iiint_{\substack{p=(x,y,t) \in Support(B_i^h)}} S(p) B_i^h(p - p^h) \, dp$$

hereinafter referred to as equation 1. After discretization of this equation we get a linear equation, which relates the unknown values of a high-resolution sequence $S^h$ to the unknown low resolution measurements $S^l$ where $B_i^h = T_i$ $(B_{(\sigma_i, \tau_i, P_i^l)})$ is a point-dependent space-time blur kernel represented in the high-resolution coordinate system.

FIG. 4 delineates steps in and around the use of equation 1 to affect spatiotemporal super-resolution. As shown in FIG. 4a, in stage 1 the low resolution video streams are created. In stage 2, the pixel optical density (Point Spread Function, induced by the lens and sensor's optical properties) and the exposure time of the various sources are measured or imported externally in order to begin constructing linear equation 1 in stage 3 which is solved in stage 10. Options in the construction of the linear equations will be discussed in FIG. 4b and solution options in FIGS. 4d and 4e.

According to the preferred embodiments of the present invention, typical support of the spatial blur caused by the point spread function in stage 2 is of a few pixels ($\sigma > 1$ pixel), whereas the exposure time is usually smaller than a single frame ($\tau <$ frame-time). The present invention therefore must increase the output temporal sampling rate by at least 1/[(input frame rate)*(input exposure time)] in order not to run the risk of creating additional blur in the non-limiting, in the exemplary case where all input cameras have the same framerate and exposure-time.

In stage 4 the required transformations $T_{i \to reference}$ are measured between the existing low-resolution inputs and the desired high-resolution output (or the reference coordinate system). Each point $P^h = (x^h, y^h, t^h)$ in the desired high-resolution output plane, is related to known points $S_i^l(P_i^l)$ according to the above transformations.

Directional regularization (stage 9) may optionally be extended from the x, y, t directions to several other space-time diagonals which can also be expressed using $L_i$, thereby enabling improved treatment of small and medium motions without the need to apply motion estimation. The regularization operator (currently is second derivative kernel of low order) may optionally be modified in order to improve the estimation of high-resolution images from non-uniformly distributed low resolution data. It should be noted that a low resolution results from limitation of the imaging process; this resolution degradation in time and in space from the low resolution is optionally and preferably modeled by convolution with a low known kernel. Also, spatial resolution degradation in space is optionally (additionally or alternatively) modeled by a point spread function. The optional regularization of stage 9 is preferably performed at least when more unknown variables ("unknowns") are present in a system of equations than the number of equations.

In stage 5 the spatial and temporal increase factors are chosen whereafter in stage 6 the coordinates of the required output are chosen.

According to the preferred embodiments of the present invention, if a variance in the photometric responsiveness of the different cameras is found, the system then preferably adds an additional preprocessing stage 7. This optional stage results in histogram-equalization of the two or more low resolutions sequences, in order to guarantee consistency of the relation in equation 1 with respect to all low resolutions sequences. After optional histogram equalization, the algorithm in stage 3 smoothes residual local color differences between input cameras in the output high-resolution sequences.

In stage 8, optionally motion-based interpolation (and possibly also motion-based regularization) is performed. This option is preferably only used for the motion of fast objects. The implicit assumption behind temporal discretization of eq. 1 (stage 3) is that the low resolution sequences can be interpolated from the high resolution sequences by interpolation of gray-levels (in the space-time vicinity of each low resolution pixel). When motion of objects is faster than the high resolution frame-rate (such that there is gray-level aliasing), a "motion-based" interpolation should preferably be used in the algorithm (stage 8). In this case motion of objects between adjacent frames of the low resolution sequences is calculated. Then "new" input frames are interpolated (warped) from the low resolution frames using motion estimation. The "new" frames are generated at the time slots of the high resolution frames (or near them) such that there is little or no gray-level aliasing, by interpolation from the high resolution frames. Eq. 1 is then constructed for the "new" frames. Another optional method, that may optionally be applied in conjunction with the previous method, involves "motion-based regularization"; rather than smoothing along the x,y,t axis and/or space-time diagonals, regularization is applied using motion estimation (or optical-flow estimation). Smoothing is therefore performed in the direction of the objects' motion (and along the time axis for static objects/background).

Optionally in stage 9 regularization is performed. Different possibilities and options for the optional regularization will be discussed in regard to FIG. 4c. In stage 10, as explained, the equations are solved in whole, or by block relaxation in stage 11 to create the output stream in stage 12. Solution of the equations will be further detailed in FIG. 4d and the process of block relaxation in 4e.

Turning now to diagram 4b, which delineates the construction of the linear equations in stage 3 in more detail, in stage 13, a linear equation in the terms of the discrete unknown values of $S^h$ is obtained. Preferably, this linear equation is obtained (stage 14) by discrete approximation of equation 1 in one of two optional methods referred to hereinafter as isotropic (stage 16) and non-isotropic (stage 15). In stage 16 optional isotropic discretization optionally warps low resolution sequence to high-resolution coordinate frame 144 and 146 (optionally without up-scaling, but possibly with up-scaling) and then optionally uses the same discretized version of $B_i^h$ for convolution with high-resolution unknowns for each low resolution warped value. This optional discretization of the analytic function $B_i^h$ may be done using any optional standard numeric approximation. The isotropic discretization may be expressed as $$S_i^l(T_i^{-1}(p^h)) = \sum_x \sum_y \sum_t{}_{b=(x,y,t)\in Support(\hat{B})} S_i^h[p^h + b] \cdot \hat{B}_i[b]$$

where $P^h$ is a grid point on the high-resolution sequence, and $\hat{B}_i$ is the blurring kernel represented at the high-resolution coordinate frame $\hat{B}_i = T_i^{-1}(B_i^l)$. The values of $\hat{B}$ by discrete approximation of this analytic function, and the values on the left-hand side $S_i^l(T_i(p^h))$ are computed by interpolation including, but not limited to linear, cubic or spline-based interpolation for example, from neighboring space-time pixels.

Optionally equation 1 may be discretized in a non-isotropic manner as shown in stage 15 by optionally discretizing $S^h$ differently for each optional low resolution data point (without warping the data), yielding a plurality of different discrete kernels, allowing each point optionally to fall in a different location with respect to its high-resolution neighbors, optionally achieved with a finite lookup table for quantized locations of the low resolution point. Non isotropic discretization may be expressed as $$S_i^l(p_i^l)) = \sum_x \sum_y \sum_t{}_{b=(x,y,t)\in Support(B_i^h(p_i^l))} \int\int\int_{\delta p \in [0-1]^3} S(p+\delta p) \cdot B_i^h(p+\delta p - p^h) d\,\delta p$$

where the computation of the integral over single unit cube is optionally defined as $\int_{[0-3]}^3$ which is an x-y unit-square at 1 high-resolution frame time.

Optionally and most preferably, the preferred embodiment of the present invention may use a combination of isotropic and non-isotropic approximation as seen in stage 16, using non-isotropic approximation in the temporal dimension and isotropic approximation in the spatial dimension, providing a single equation in the high-resolution unknowns for each low resolution space-time measurement. This leads to the following huge system of linear equations in the unknown high-resolution elements of $S^h$: $A\vec{h} = \vec{1}$ in stage 18 where $\vec{h}$ is a vector containing all the unknown high-resolution color values of $S^h$, $\vec{1}$ is a vector containing all the space-time measurements from all the low resolutions sequences and the matrix A contains the relative contributions of each high-resolution space-time point for each low resolution space-time point as defined in the equation above. It should be noted that both non-isotropic and isotropic discretization may optionally be used in combination (stage 17).

The above discretization (stage 14) is optionally applied according to $A\vec{h} = \vec{1}$ in stage 18 where $\vec{h}$ is a vector containing color values for the video data with the adjusted resolution and $\vec{1}$ is a vector containing spatial and temporal measurements, giving equation 2 for solution in stage 10.

Turning now to diagram 4c, the optional regularization of the system which may be performed, instead of the general method of equation construction in stage 3, and before solution of the equations in stage 10, is delineated.

According to the preferred embodiments of the present invention, the two or more low resolution video cameras may optionally yield redundant data as a result of the additional temporal dimension which provide more flexibility in applying physically meaningful directional space-time regularization. Thus in regions which have high spatial resolution (prominent special features) but little motion, strong temporal regularization may optionally be applied without decreasing space-time resolution. Similarly in regions with fast dynamic changes, but low spatial resolution, strong spatial regularization may optionally be employed without degradation in the space-time resolution, thereby giving rise to the recovery of higher space-time resolution than would be obtainable by image-based super resolution with image-based regularization.

According to the embodiments of the present invention, the number of low resolution space-time measurements in $\vec{1}$ may optionally be greater than or equal to the number of space-time points in the high-resolution sequence $S^h$ (i.e. in $\vec{l}$), generating more equations than unknowns in which case the equation may be solved using least squares methods (the preferred method) or other methods (that are not based on least square error) in stage 10. The case wherein the number of space-time measurements may also be smaller by using regularization has been detailed earlier. In such an event because the size of $\vec{l}$ is fixed, and thus dictates the number of unknowns in $S^h$ an optional large increase in spatial resolution (which requires very fine spatial sampling) comes at the expense of increases in temporal resolution (which requires fine temporal sampling in $S^h$) and vice versa. This fixed number of unknowns in $S^h$ may however be distributed differently between space in time, resulting in different space-time resolutions.

According to the most preferred embodiments of the present invention regularization may optionally include weighting $W_i$ in stage 20 separately in each high-resolution point according to its distance from the nearest low resolution data points calculated in stage 20, thereby enabling high-resolution point 120 which converges with low resolution point 102 to be influenced mainly by the imaging equations, while distant points are optionally controlled more by the regularization. Trade-offs between spatial and temporal regularization and the global amount of regularization may most preferably be applied by different global weights $\lambda_i$ (stage 19), where $$\vec{h}_{MAP} = \underset{\vec{h}}{\mathrm{argmin}}\left\{ (A\vec{h} - \vec{l})^T N (A\vec{h} - \vec{l}) + \sum \lambda_i (L_i \vec{h})^T W_i (L_i \vec{h}) \right\}$$

may also utilize unknown errors of the space-time coordinate transformations through the error matrix N, which is the inverse of the autocorrelation matrix of noise thereby optionally assigning lower weights in the equation system to space-time points of the low resolutions sequence with high uncertainty in their measured locations when space-time regularization matrices are calculated (stage 20).

According to another preferred embodiment of the present invention the input video sequences may be of different dynamic range and the high-resolution output sequence may optionally be of higher dynamic range than any of the input sequences. Each of the low dynamic range inputs is then optionally and preferably imbedded into higher dynamic range representation. This optional mapping of input from sensors of different dynamic range is computed by the color correspondence induced by the space-time coordinate transformations. Truncated gray levels (having values equal to 0 or 255) are preferably omitted from the set of equations $A\vec{h} = \vec{l}$, where the true value is likely to have been measured by a different sensor.

According to another embodiment of the present invention, the two or more video cameras are found insufficient in number relative to the required improvement in resolution either in space-time volume, or only portions of it. The solution to the above set of equations is then optionally and preferably provided with additional numerical stability by the addition of an optionally directional space-time regularization term in stage 20 which imposes smoothness on the solution $S^h$ in space-time regions which have insufficient information where the derivatives are low, does not smooth across space-time edges (i.e. does not attempt to smooth across high resolution pixels 136/140) and as previously mentioned controls the ringing effect caused by the rectangular shape of the temporal blur. The present invention thus optionally seeks $\vec{h}$ which minimize the following error term :

$$\min\left( \|A\vec{h} - \vec{l}\|^2 + \|W_x L_x \vec{h}\|^2 + \|W_y L_y \vec{h}\|^2 + \|W_t L_t \vec{h}\|^2 \right)$$

(equation 3, stage 10) where $L_j(j=x,y,t)$ is a matrix capturing the second-order derivative operator in the direction j, and $W_j$ is a diagonal weight matrix which captures the degree of desired regularization at each space-time point in the direction j. The weights in $W_j$ prevent smoothing across space-time edges. These weights are optionally determined by the location orientation or magnitude of space-time edges and are approximated using space-time derivatives in the low resolutions sequence. Other regularization functions $\rho(L_j h)$ may be used instead of the square error function ($\|\ldots\|^2$ that is the $L_2$ norm). In particular, at least one of the $L_1$ norm (the absolute function), a robust estimator using the Huber function, or the Total Variation estimator using the Tikhonov style regularization (common methods are mentioned in: D. Capel and A. Zisserman. Super-resolution enhancement of text image sequences; ICPR, pages 600-605, 2000) may be applied.

Figure 4A:
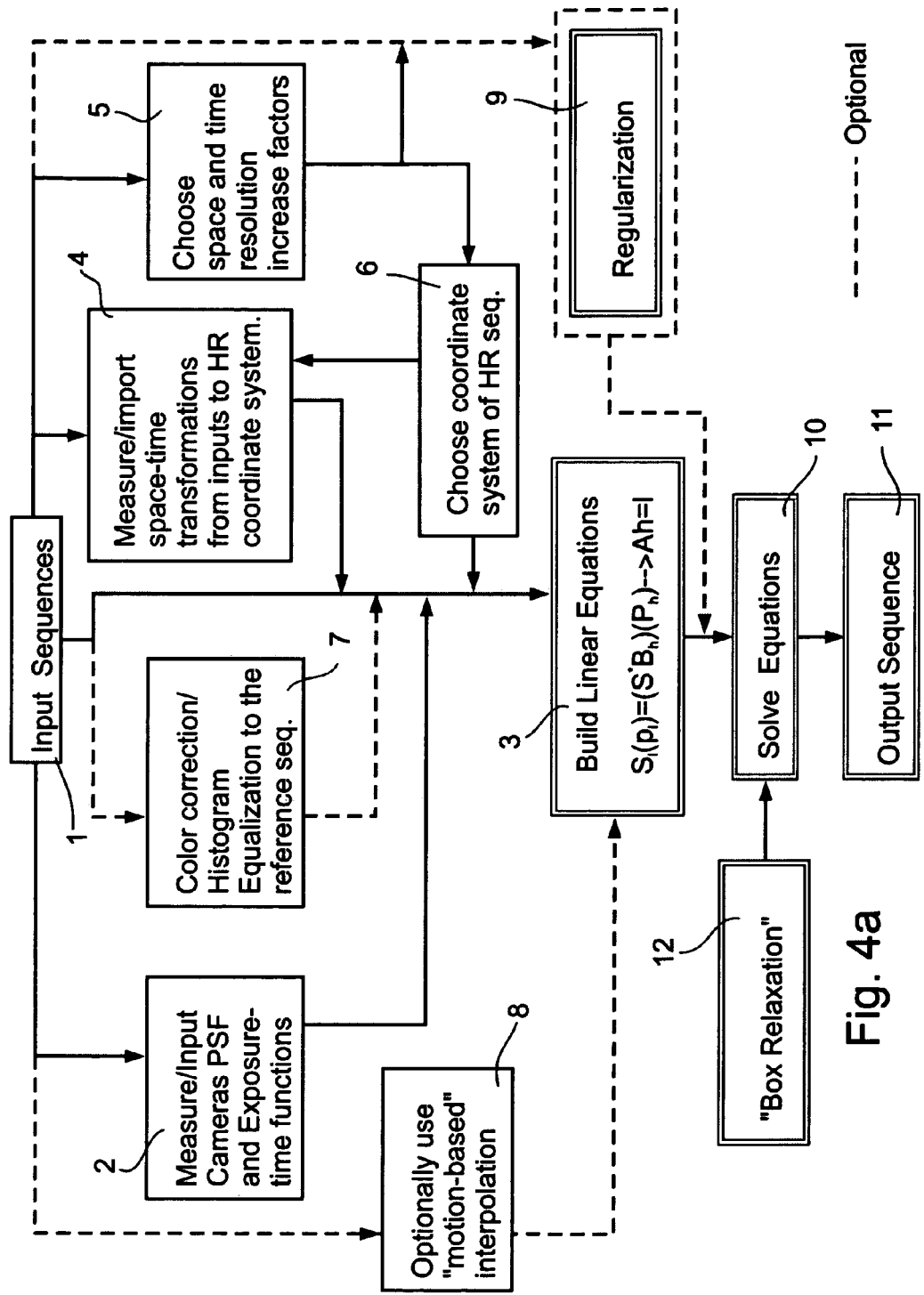
FIG. 4 is a flow chart of a proposed embodiment according to the present invention.
Figure 4B:
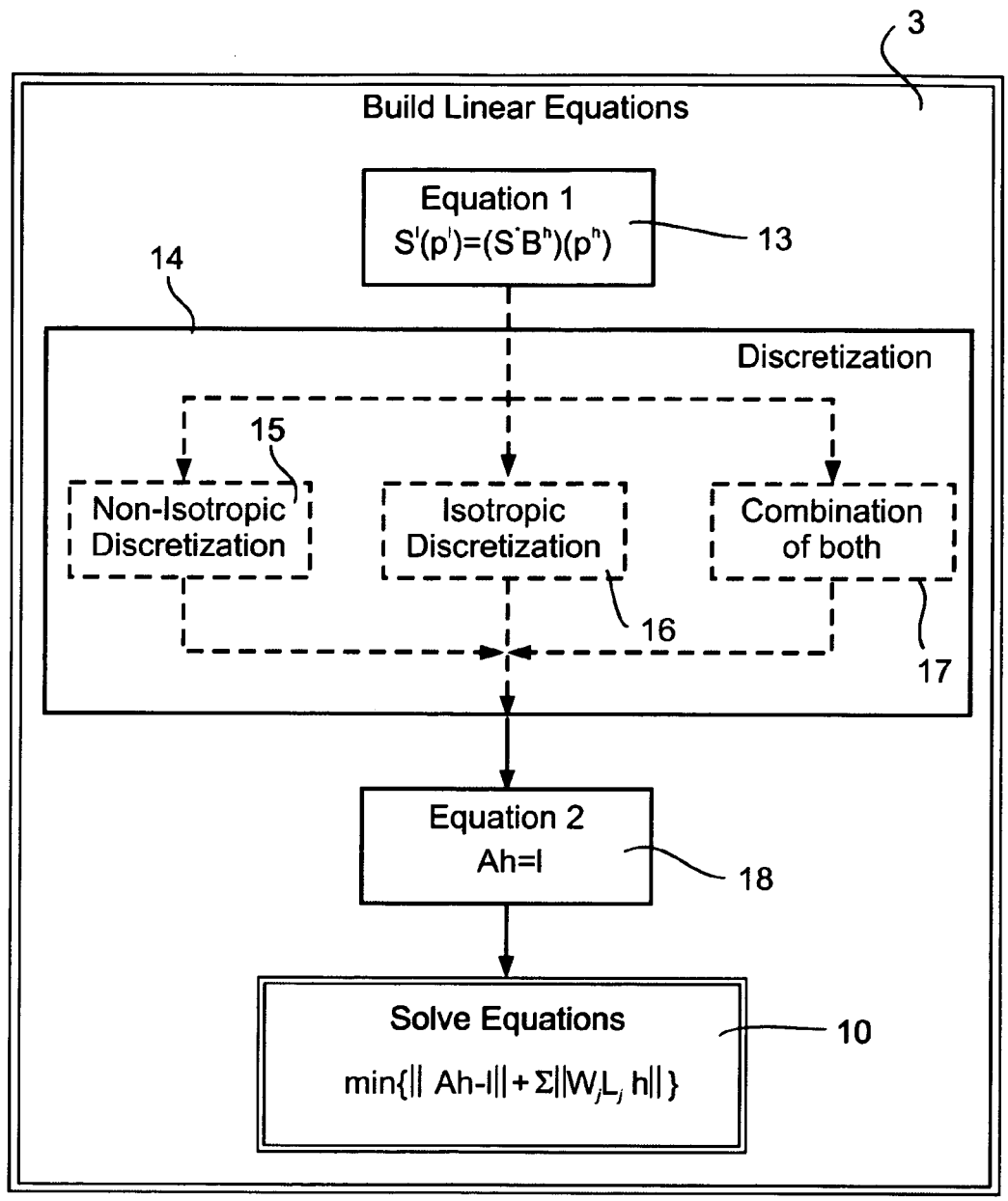
Figure 4C:
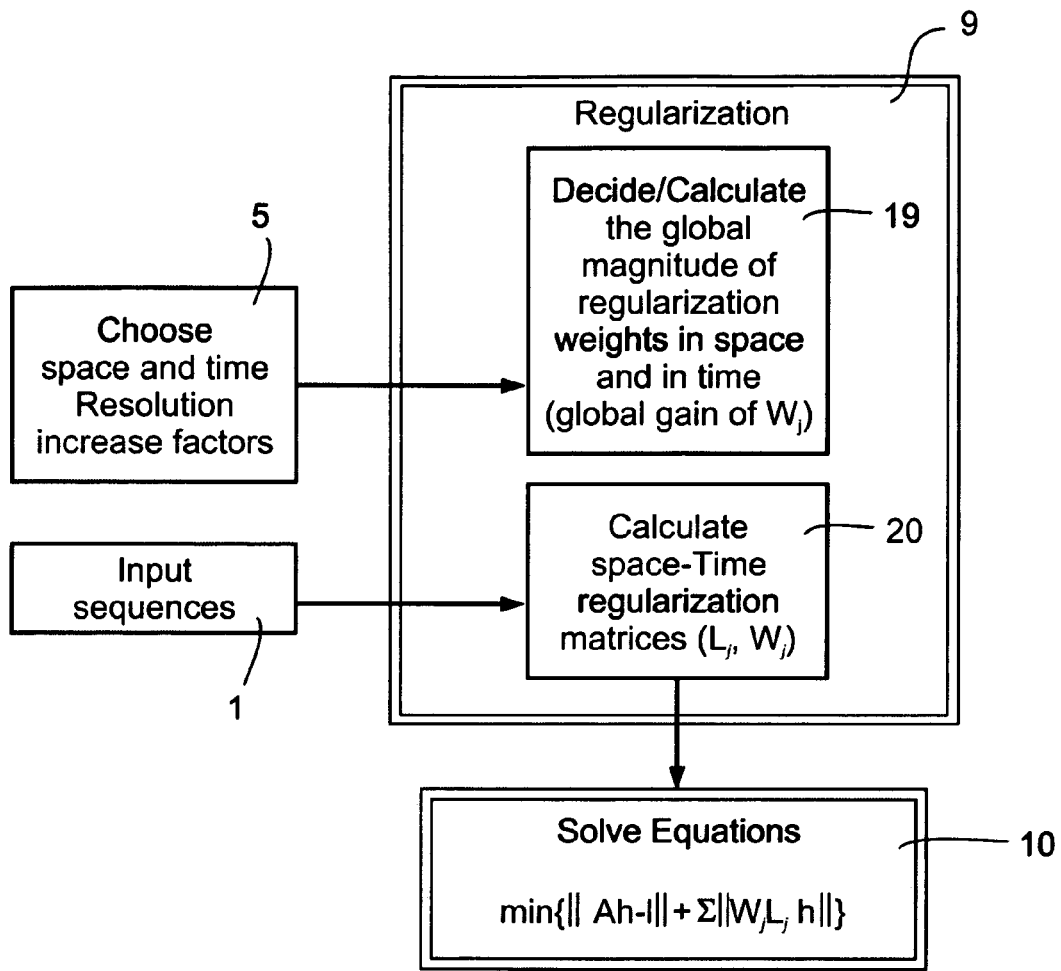
Figure 4D:
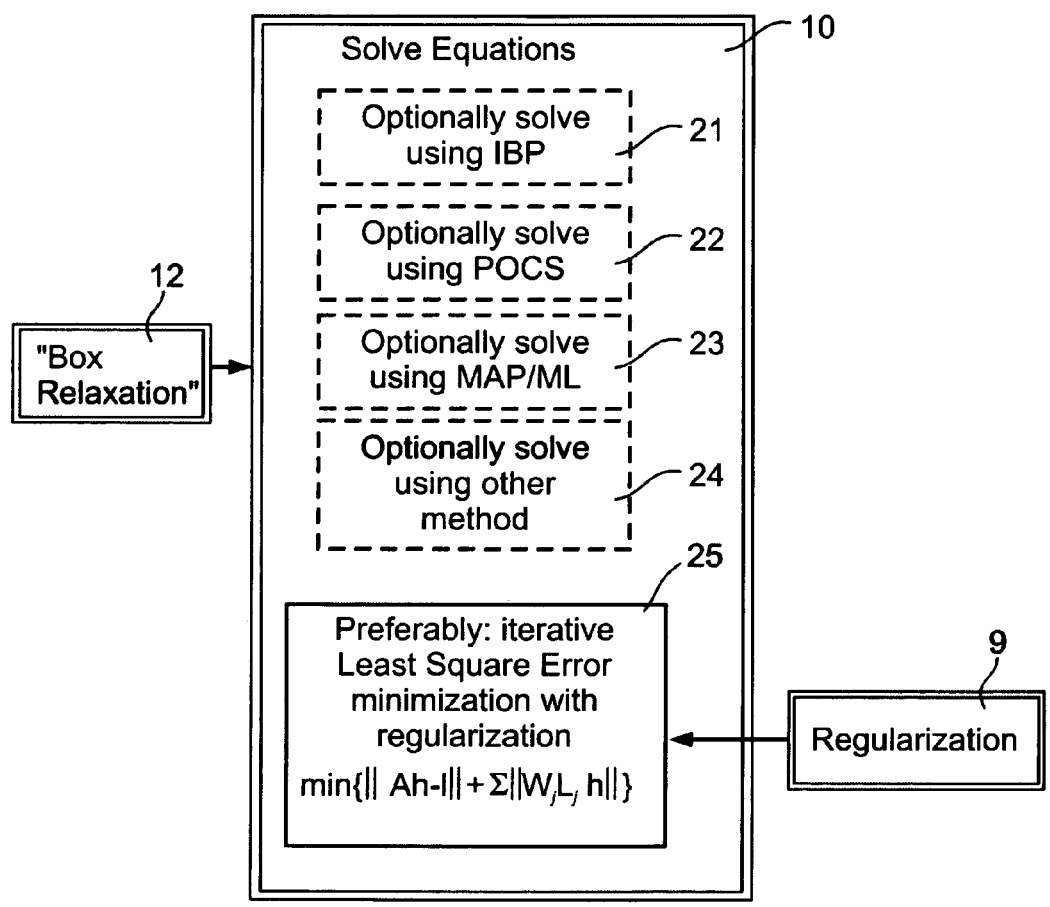

The optimization above may have a large dimensionality, and may pose a severe computational problem which is resolved in solution methods outlined in FIG. 4d.

According to the embodiments of the present invention, the number of low resolution space-time measurements in $\vec{l}$ may optionally be greater than or equal to the number of space-time points in the high-resolution sequence $S^h$ (i.e. in $\vec{l}$), generating more equations than unknowns in which case the equation may be solved using least squares methods in. In such an event because the size of $\vec{l}$ is fixed, and thus dictates the number of unknowns in $S^h$ an optional large increase in spatial resolution (which requires very fine spatial sampling) comes at the expense of increases in temporal resolution (which requires fine temporal sampling in $S^h$) and vice versa. This fixed number of unknowns in $S^h$ may however be distributed differently between space in time, resulting in different space-time resolutions.

According to an alternative embodiment of the present invention, equation 1 is optionally assumed to be inaccurate and a random variable noise (error) term is added on the right-hand side in stage 20 (FIG. 4c). This optional formalism gives the super-resolution problem the form of a classical restoration problem model, optionally assuming that the error term is independent and identical (i.i.d.) and has Gaussian distribution ($N(o,\sigma^2)$) where the solution is in fact $$\vec{h}_{MAP} = \underset{\vec{h}}{\mathrm{argmin}}\left\{ (A\vec{h} - \vec{l})^T N (A\vec{h} - \vec{l}) + \sum \lambda_i (L_i \vec{h})^T W_i (L_i \vec{h}) \right\}$$

(equation 3, stage 10) without regularization terms.

Turning to FIG. 4d, various solution methods in stage 10 are delineated, and are preferably chosen according to which method provides the optimally efficient solution.

In the event that matrix A is sparse and local (i.e. that the nonzero entries are confined to a few diagonals) the system is optionally and most preferably solved using box relaxation methods in stage 12 (outlined in more detail in FIG. 4e) or any of the other fast numerical methods algorithms, rather than a full-calculation approach. The box relaxation technique may also optionally be used with many other solution methods.

It may optionally be assumed that the high-resolution unknown sequence is a random process (Gaussian random vector with non-zero mean vector and an auto-correlation matrix) which demonstrates equation 3 as a MAP (Maximum A-Posteriori) estimator (stage 23) for the high resolution sequence. This preferred approach utilizing a local adaptive prior knowledge of the output high resolution sequence in the form of regularization, which are provably connected to the auto-correction matrix of the output, and are controllable externally through the prior term as follows:

$$\vec{h}_{MAP} = \underset{\vec{h}}{\operatorname{argmin}}\left\{(A\vec{h} - \vec{l})^T N(A\vec{h} - \vec{l}) + \Sigma\lambda_i(L_i\vec{h})^T W_i(L_i\vec{h})\right\}$$

The output sequence in stage 11 may also optionally be calculated by other methods, including IBP (stage 21) (M. Irani and S. Peleg. Improving resolution by image registration. CVGIP:GM, 53:231 {239, May 1991)), POCS (stage 22) (A. J. Patti, M. I. Sezan, and A. M. Tekalp. Superresolution video reconstruction with arbitrary sampling lattices and nonzero aperture time; IEEE Trans. on Image Processing, volume 6, pages 1064{1076, August 1997)) and other methods (stage 24), such as those described for example in S. Borman and R. Stevenson. Spatial resolution enhancement of low-resolution image sequences—a comprehensive review with directions for future research. Technical report, Laboratory for Image and Signal Analysis (LISA), University of Notre Dame, Notre Dame, July 1998).

In stage 25, the equations are solved, preferably by using iterative least square error minimization with regularization (regularization was described with regard to stage 9). The preferable iterative method is "Conjugate Gradient" but other standard methods such as "Steepest Descent", "Jacobi method", "Gauss-Seidel method" or other known iterative methods (see for example R. L. Lagendijk and J. Biemond. *Iterative Identification and Restoration of Images*, Kluwer Academic Publishers, Boston/Dordrecht/London, 1991) may optionally be used.

Figure 4E:
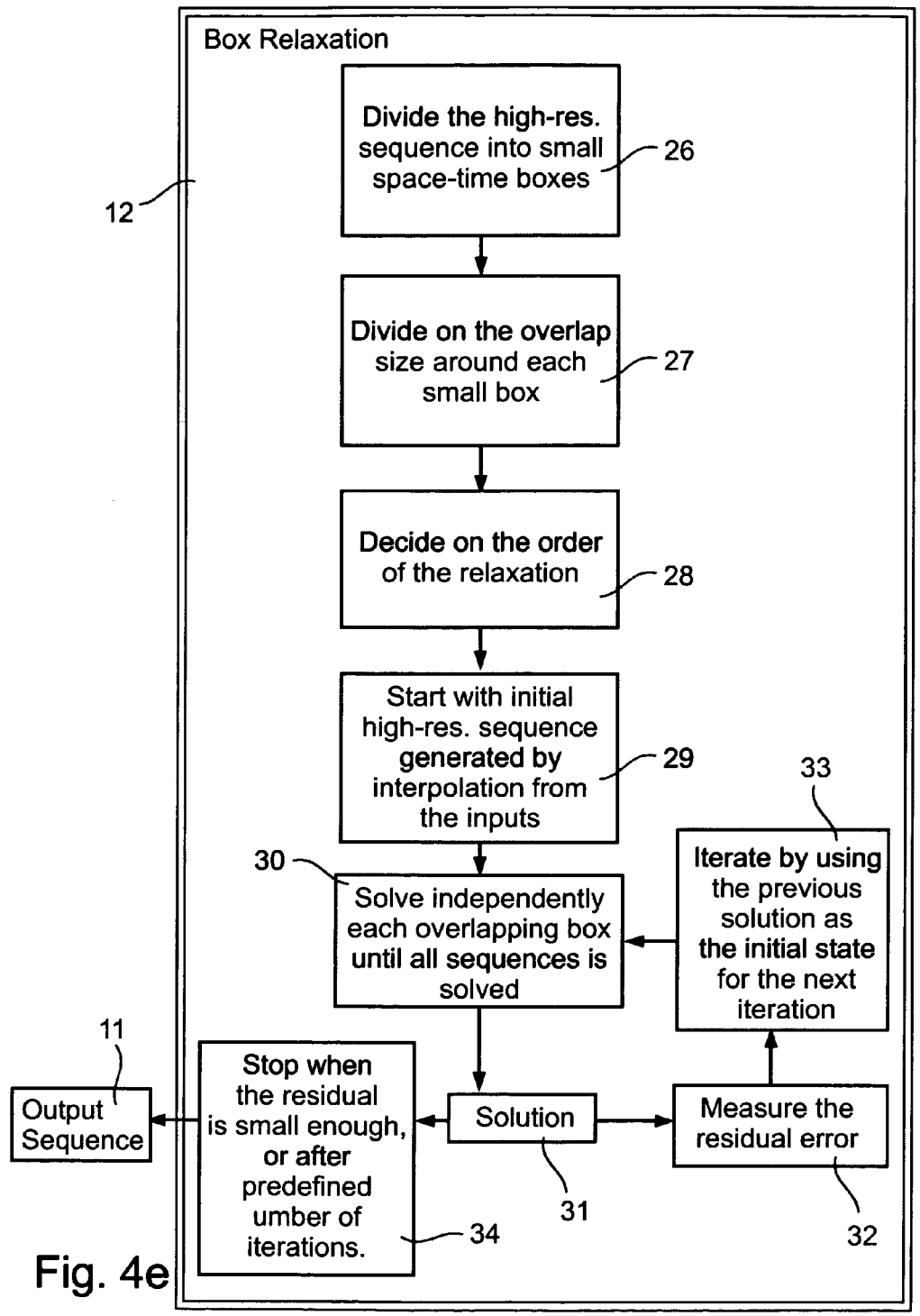

FIG. 4e is a flow-chart of the method of "box relaxation" (see for example U. Trottenber, C. Oosterlee, and A. Schuller. *Multigrid*. Academic Press, 2000) (shown overall as stage 12), which is a fast method of calculation used to solve the set of equations, rather than a full calculation approach, in order to overcome its immense dimensionality within the constraints of processors available today. In stage 26 the high-resolution sequence is divided into small space-time boxes, for example of size 7 by 7 by 10 pixels in two frames. In stage 27 an overlap size around each of these small boxes is chosen, which for example is preferably at least half of the blur kernel size. In stage 28 the order in which the boxes are resolved is chosen, optionally according to the following sequential order: X→Y→T, thereby solving temporal "slices" of several frames wide, in which for each "slice", the block order is row-wise.

In stage 29 an initial high-resolution sequence is generated from the inputs, which forms the basis for the repetitive process that follows in stages 30-33. In this process, each overlapping box is solved in stage 30, preferably by using the iterative method in stage 25 or optionally by direct matrix inversion (that is possible due to the small number of unknowns in each box). The solution is reached in step 31, and the residual error is measured in stage 32. In stage 33 the solution is iterated using the previous solution as the basis for the next iteration.

This may continue, optionally until the residual falls below a pre-determined value, or for a fixed number of iterations or in accordance with any other constraint chosen until the calculation stops in stage 34, yielding the super-resolution output sequence in stage 11.

Figure 5:
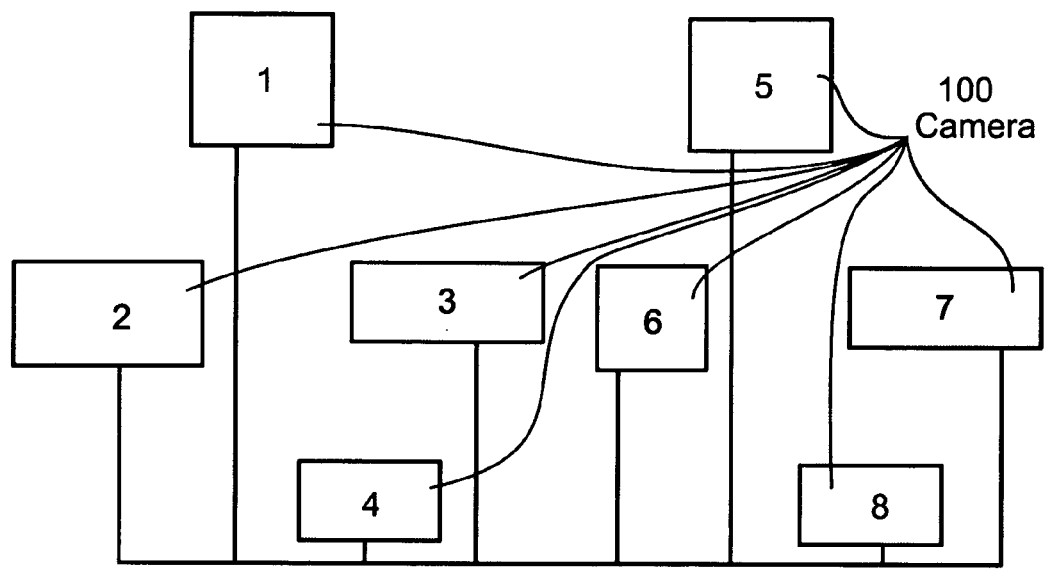
FIG. 5 is an exemplary system according to the present invention with eight low resolution cameras.

In FIG. 5, as an additional example, and without any intention of being limiting, a system where 8 video cameras 100 are used to record dynamic scene 104 is now presented. According to the preferred embodiments of the present invention the spatial sampling rate alone may be increased by a factor of $\sqrt{8}$ in x and y, or increase the temporal frame rate alone by a factor of 8, or any combination of both: for example increasing the sampling rate by factor of 2 in all three dimensions. In standard spatial super resolution the increase in sampling rate is most preferably equal in all spatial dimensions in order to maintain the aspect ratio of image pixels and prevent distorted looking images, while the increase in spatial and temporal dimensions may be different. When using space-time regularization, these factors may be optionally increased, however the inherent trade-off between the increase in time and in space will remain.

Figure 6:
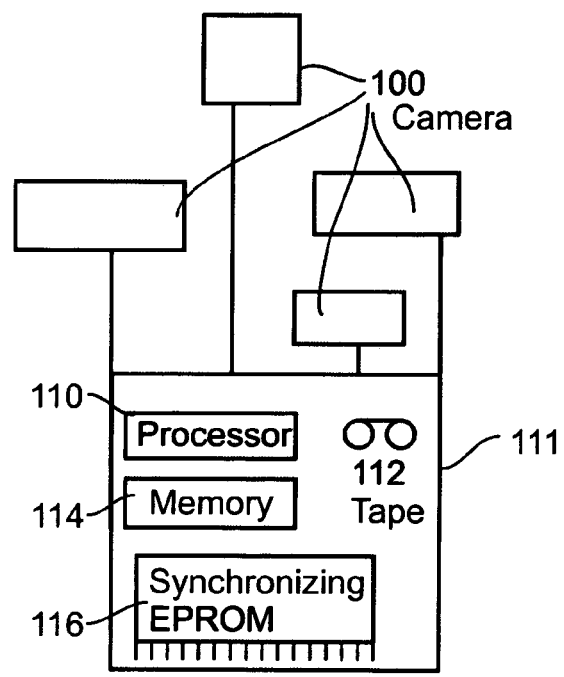
FIG. 6 is a system diagram of an exemplary system according to the present invention with camera synchronization.

Turning now to FIG. 6, a system diagram according to the present invention is shown, with a system with the capacity to store synchronized sequences. According to an additional preferred embodiment of the present invention, temporal super resolution of input sequences from the two or more low resolution cameras 100 is optimized by spacing the sub-frame shifts of the various cameras equally in time in order to increase the quality of motion de-blurring and resolving motion aliasing. This may be implemented optionally by the use of a binary counter 116 receiving signals from a master synchronization input whereby the binary counter may thus generate several uniformly spread synchronization signals by counting video lines (or horizontal synchronization signals) of a master input signal and sending a dedicated signal for each camera, optionally using an "EPROM" which activates these cameras as shown, or optionally implemented using any combination of electronic hardware and software according to principles well-known in the art of electronics.

According to yet another preferred embodiment of the present invention, in the extreme case where only spatial resolution improvement is desired, the two or more cameras 100 are most preferably synchronized such that all images are taken at exactly the same time, thus temporal resolution is not improved but optimal spatial resolution is being achieved.

Figure 7A:
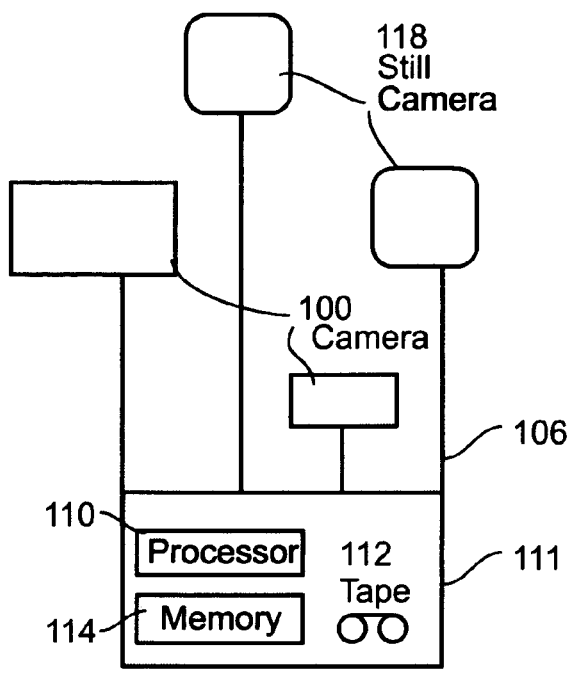
FIG. 7 is a system diagram of an exemplary system according to the present invention with different space-time inputs.

FIG. 7a presents a system with different space-time inputs. In addition to low spatial resolution video cameras 100 (with high temporal resolution), there are now added high spatial resolution still cameras 118 that capture still images of the scene (with very low or no temporal resolution). Such still images may optionally be captured occasionally or periodically, rather than continually.

Figure 7B:
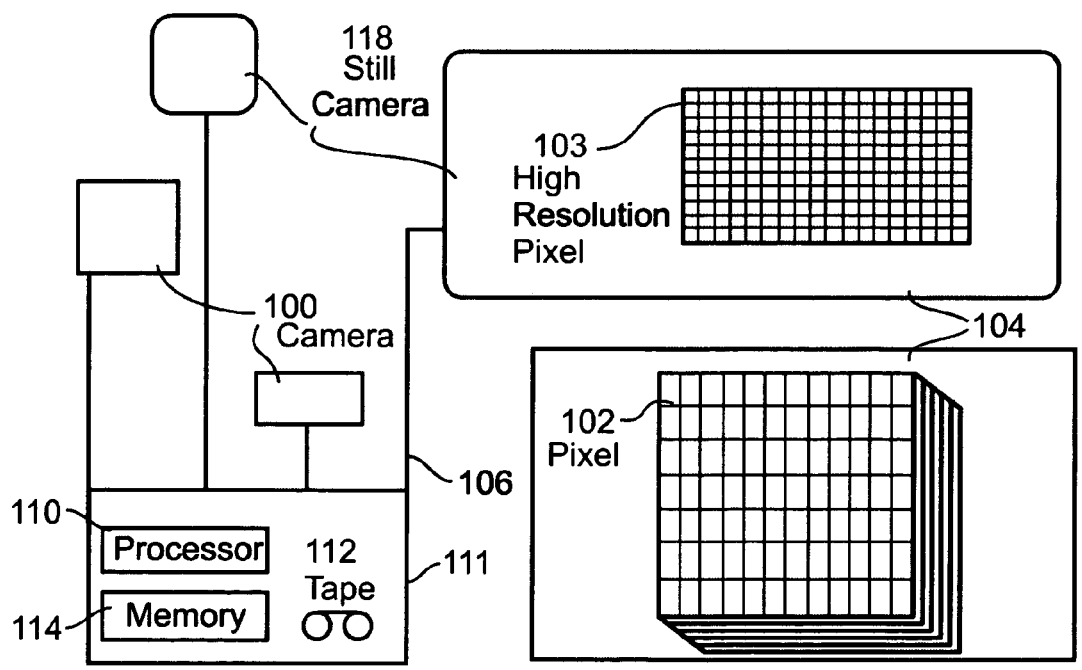

FIG. 7b displays the size difference between low-resolution camera pixel 102 and high resolution camera pixel 102/103. The data from scene 104 is displayed as a flat single bitmap image in camera 118 while in video camera 100, this data has layers denoting temporal frequency. These sources may also have different exposure-times. By combining the information from both data sources using a method according to the present invention, a new video sequence may be created, in which the spatial resolution is enhanced relative to the video source (the frame size is the same as the still image source) and the temporal resolution is higher than in the still image source (the frame-rate is the same as in the video source). By using more than one source of each kind, the spatial and/or temporal resolution of the output video may also exceed the highest resolution (in space and/or in time) of any of the sources ("true" super-resolution).

Figure 8A:
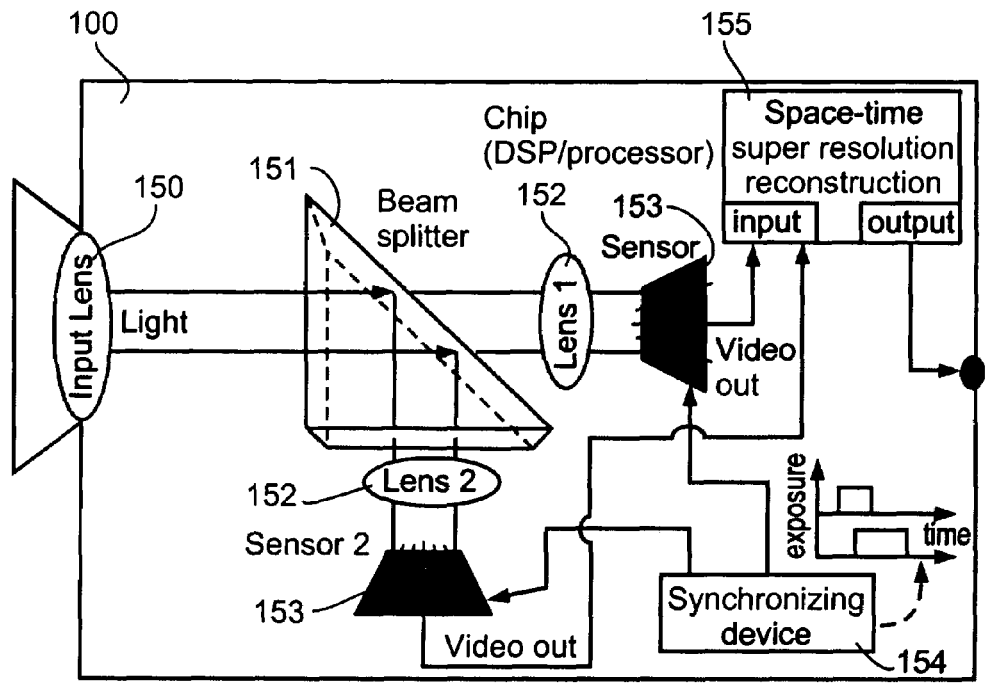
FIG. 8 shows an exemplary system diagram of a single camera with optional configurations of multi-sensor cameras and/or single sensors according to preferred embodiments of the present invention.

FIG. 8A is a system diagram of a single camera with joint optics according to the preferred embodiments of the present invention. Light enters camera 100 though input lens 150 which serves as a global lens and affects all detectors. Light entering through lens 150 falls on beam splitter 151 which distributes it among the various sensors 153, of which 2 are displayed by way of non-limiting example. Each sensor 153 may have a lens or filter 152 of its own in order to affect focus or coloration or Point Spread Function as needed. Sensors 153 may optionally be synchronized in time by a synchronizing device 154, or may be spatially offset from one another or both or of different spatial resolutions. Sensors 153 convert light into electronic information which is carried into a microchip/digital processor 155 which combines the input from the sensors according to the algorithms outlined in the figures above into the improved output stream.

As shown in all of FIGS. 8A-F, the duration of the exposure time of each image frame grabbed by the set of one or more corresponding detectors 153 is shown as exposure time 200. The lower axis is the projection of the operation of detectors 153 on the time axis, and the right axis is the projection on the spatial axis.

It will be noted that camera 100 may also optionally be an analogue camera (not shown.) In the analogue case, the camera will be equipped with an oscillator or integrating circuit with no memory. The analogue signal is then combined according to the preferred embodiments of the present invention to affect super-resolution. FIGS. 8B-F describe non-limiting, illustrative examples configurations of detectors 153 and their effects on the output streams. It will be borne in mind that while these configurations are presented as part of an exemplary single camera embodiment, these identical configurations of detectors may be placed amongst a plurality of cameras. These configurations may also optionally be implemented with a single image array sensor (e.g. Charge-Couple Device (CCD), Complementary Metal-Oxide Semiconductor (CMOS), CMOS "Active Pixel" sensors (APS), Near/Mid/Far Infra-Red sensors (IR) based on semiconductors (e.g. InSb, PtSi, Si, Ge, GaAs, InP, GaP, GaSb, InAs and others), Ultra-Violet (UV) sensors, and/or any other appropriate imaging sensors), having a plurality of detectors thereon with the appropriate spatial-temporal misalignments. The ability to control the exposure-time (and dynamic range) of a single detector (pixel) or a set of detectors has already been shown in the literature and in the industry (see for example O. Yadid-Pecht, B. Pain, C. Staller, C. Clark, E. Fossum, "CMOS active pixel sensor star tracker with regional electronic shutter (http://www.ee.bgu.ac.il/~Orly_lab/publications/CMOS active pixel sensor star tracker with regional electronic shutter.pdf)", IEEE J. Solid State Circuits, Vol. 32, No. 2, pp. 285-288, February 1997; and O. Yadid-Pecht, "Wide dynamic range sensors (http://www.ee.bgu.ac.il/~Orly_lab/publictions/WDR_maamar.pdf)", Optical Engineering, Vol. 38, No. 10, pp. 1650-1660, October 1999). Cameras with "multi-resolution" sensors are also known both in academic literature and in the industry (see also F. Saffih, R. Hornsey (2002), "Multiresolution CMOS image sensor (http://www.cs.yorku.ca/~homsey/pdf/OPTO-Canada02 Multires.pdf) ", Technical Digest of SPIE Opto-Canada 2002, Ottawa, Ontario, Canada 9-10 May 2002, p. 425; S. E. Kemeny, R. Panicacci, B. Pain, L. Matthies, and E. R. Fossum, *Multiresolution image sensor, IEEE Trans. on Circuits and Systems for Video Technology*, vol. 7 (4), pp. 575-583, 1997; and http://iris.usc.edu/Vision-Notes/bibliography/compute65.html as of Dec. 11, 2002). Information about products having such sensors may optionally be also found at http://www.afrlhorizons.com/Briefs/0009/MN0001.html as of Dec. 11, 2002 (Comptek Amherst Systems, Inc.) and http://mishkin.jpl.nasa.gov/csmtpages/APS/status/aps_multires.html (NASA), as of Dec. 11, 2002. It should be noted that these references are given for the purposes of information only, without any intention of being limiting in any way.

These sensors can switch between several resolution modes where for the highest resolution the video frame-rate is the slowest, and for lower resolution modes (only a partial pixel set is activated or the detectors are averaged in block groups), faster video frame-rates are possible.

Figure 8B:
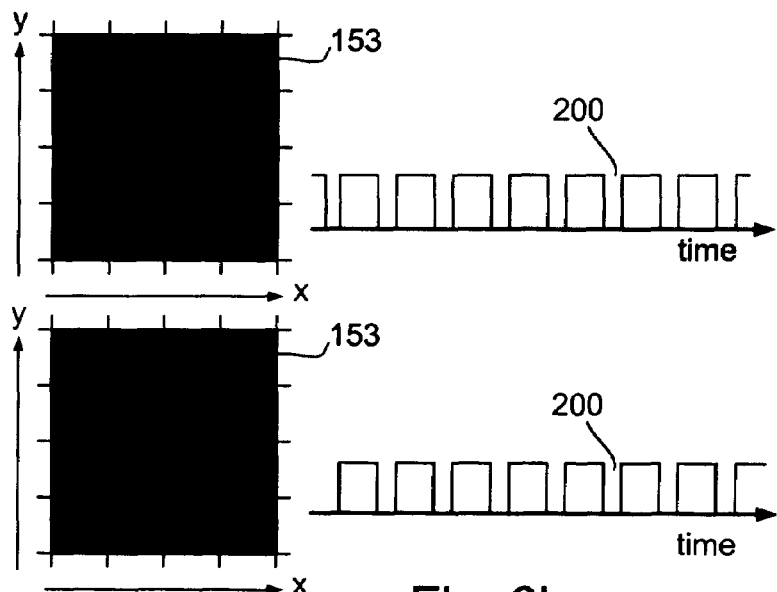

FIG. 8B shows a system with detectors 153 having the same space-time resolution, i.e. exposure time 200 are of the same size in the x, y and time dimensions as shown, but are offset it these dimensions. These detectors 153 are possibly shifted spatially and/or temporally. This configuration is suitable for all applications combining multiple cameras with same input resolutions for temporal and/or spatial super-resolution.

Figure 8C:
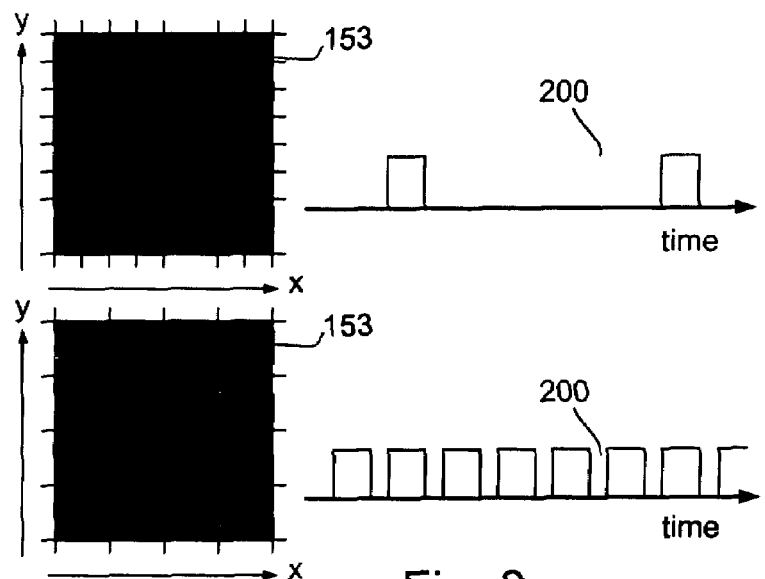

FIG. 8C shows a system with with different space-time resolution sensors.

This configuration is suitable for the applications combining information from detectors 153 with different resolution. The different size of detectors 153 is clearly visible on the x-y plane, as well as in time where the number of exposure times 200 shows their frequency. And this configuration will display similar functionality to the system displayed in FIG. 7 with variable space-time inputs.

Figure 8D:
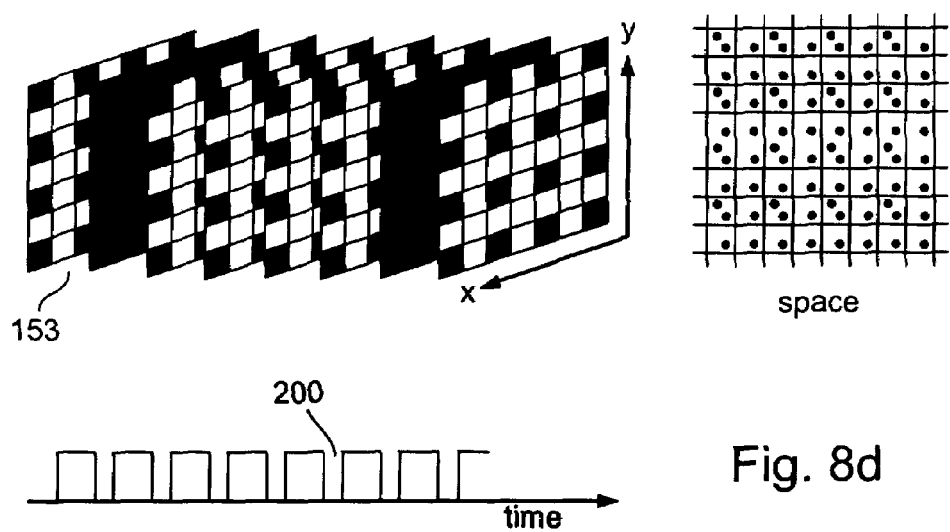

FIG. 8D shows a system with detector 153 having different spatial resolutions on the x-y plane and no temporal overlaps on the time plane. A detector 153 source with high spatial and low temporal resolutions, and a detector 153 source with high temporal and low spatial resolutions, can optionally be combined in a single sensor with different exposure times 200. The different detector sets are denoted by the different color dots on the right-hand figures. The coarse set of detectors (red color) have high temporal and low spatial resolutions again like the video camera in FIG. 7, and the dense set (blue detectors) have high spatial and low temporal resolutions similar in functionality to the still camera outlined with regard to FIG. 7.

Figure 8E:
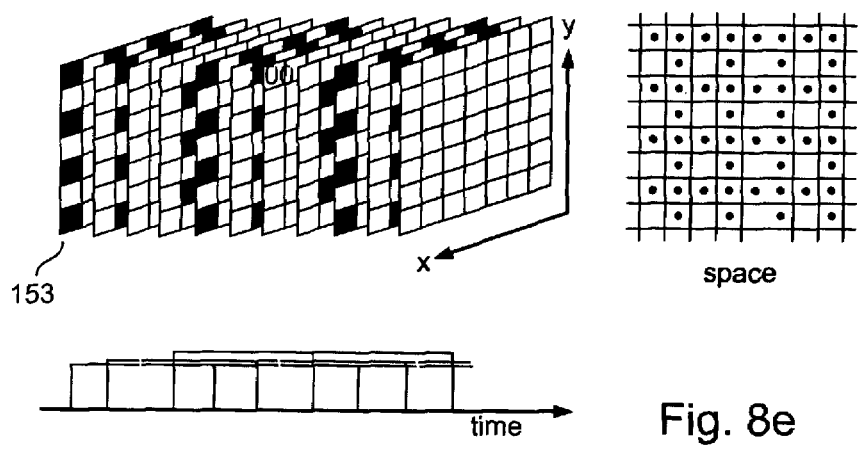

FIG. 8e shows a system with detector 153 sets with same space-time resolutions, shifted spatially on the x-y plane, with overlapping exposures. Four colored detector 153 sets are arranged in 2*2 blocks with same spatial resolution on the x-y plane and the temporal exposures are overlapping. This configuration enables temporal super-resolution while reaching "full" spatial resolution (the dense grid) at least on static regions of the scene. These overlapping exposures are best suited to effectively capture relatively dark scenes with reduced motion-blur in the output.

Figure 8F:
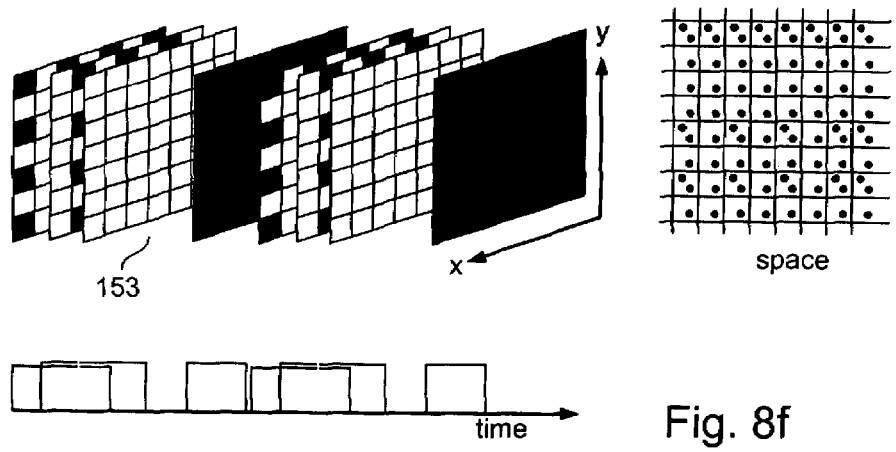

FIG. 8f shows a system with detector 153 sets with different space-time resolutions, some sets shifted spatially on the x-y plane, some sets with overlapping exposures on the time plane. This is in effect a combination of the two previous configurations, where the red, yellow and green detectors 153 are of low spatial resolution and with overlapping exposures and the blue detectors are of high spatial resolution with no exposure overlap and with possibly different exposure than the others.

A single camera may also optionally have a combination of several of the "irregular sampling" sensors (8d-8f) and "regular" sensors for gaining more advantages or for different treatment of color video—each color band may optionally be treated independently by a different sensor or by a different detector-set in the same sensor. For example it is known in the art that the G band is the most important and therefore may preferably use a higher spatial resolution (a denser detector grid or more detectors) than the R and B bands.

While the invention has been described with respect to a limited number of embodiments, it will be appreciated that many variations, modifications and other applications of the invention may be made.

What is claimed is:

1. A method for increasing at least the temporal resolution of a space-time visual entity in terms of frame rate and exposure time, comprising:
   providing sequences of space-time visual entities from a plurality of input sources having first exposure times at one or more respective first resolutions, each one of said plurality of input sources receiving information depicting a common scene from a different sensor, each said sequence having a first quality according to respective said first exposure time; and
   combining said information from said plurality of input sources to produce an output sequence of space-time visual entities at a second resolution higher than any of said plurality of first level resolutions in at least a temporal dimension, said output sequence having a second quality higher than said first quality.

2. The method of claim 1, wherein each of said plurality of input sources comprises at least one of a sequence of images of a scene, a still image, a stream of data from visual detectors, video data of a scene or a combination thereof.

3. The method of claim 2, wherein said sequence of space-time visual entities is a single sequence of images.

4. The method of claim 1, wherein said plurality of input sources at said first resolutions comprises respectively sources of different space-time resolutions.

5. The method of claim 4, wherein said plurality of input sources comprises sequences of images from at least one of NTSC video sequence, PAL video sequence, HDTV video sequence, SECAM video sequence, a suitable video format or still images.

6. The method of claim 1, wherein said combining further comprises:
   obtaining at least one relative spatial relation between said input sources.

7. The method of claim 1, wherein said combining further comprises:
   obtaining at least one relative temporal relation between said input sources.

8. The method of claim 1, further comprising:
   determining a minimum number of said input sources for obtaining a desired said second resolution, for increasing a temporal resolution.

9. The method of claim 6, wherein said spatial relations are obtained in a pre-calibration process.

10. The method of claim 6, wherein said obtaining further comprises computing at least one misalignment between said plurality of said input sources.

11. The method of claim 1, wherein at least two of said different sensors share joint optics.

12. The method of claim 7, wherein said temporal relations are obtained via temporal synchronization hardware.

13. The method of claim 12, wherein said temporal synchronization hardware performs a phase shift between sampling times of said different sensors.

14. The method of claim 7, wherein said obtaining further comprises computing at least one misalignment between said plurality of input sources.

15. The method of claim 1, wherein said increasing at least temporal resolution comprises increasing both spatial resolution and temporal resolution.

16. The method of claim 1, wherein said increasing temporal resolution reduces one or more spatial artifacts related to said input sources.

17. The method of claim 1, wherein said increasing at least the temporal resolution comprises a capability to reconstruct high resolution frequencies, that are not expressed in any of plurality of said space-time visual entities.

18. The method of claim 17, wherein said reconstructed high frequencies are space-time frequencies.

19. The method of claim 17, wherein said reconstructed high frequencies are temporal frequencies.

20. The method of claim 1 wherein said increasing at least temporal resolution comprises reducing exposure time relative to that of said input sources.

21. The method of claim 1 wherein said increasing at least temporal-resolution comprises reducing motion blur relative to plurality of said space-time visual entities.

22. The method of claim 1, wherein said increasing temporal resolution comprises increasing temporal frequencies without increasing frame rate.

23. The method of claim 1, wherein each of said space-time visual entities comprises at least one unit, and wherein each unit comprises a plurality of sub-units, such that at least one said space-time visual entities is misaligned at a sub-unit level, wherein increasing at least temporal resolution is according to at least one sub-unit misalignment.

24. The method of claim 23, wherein said sub-unit misalignment comprises at least a temporal misalignment.

25. The method of claim 24, wherein said sub-unit misalignment comprises both spatial and temporal misalignment.

26. The method of claim 23, wherein said sub-unit misalignment is predetermined.

27. The method of claim 1, wherein said increasing at least temporal resolution comprises increasing the frame-rate relative to said input sources.

28. The method of claim 7, wherein said temporal relation comprises a one-dimensional affine transformation in time.

29. The method of claim 6, wherein said spatial relation comprises a two-dimensional projective transformation.

30. The method of claim 6, wherein said spatial relation comprises a two-dimensional affine transformation.

31. The method of claim 1, wherein said first resolution results from limitation of an imaging process and wherein resolution degradation in time and in space is modeled by convolution with a kernel.

32. The method of claim 31, wherein said kernel comprises a plurality of regional kernels for separate portions of said entities from said plurality of input sources.

33. The method of claim 31, wherein resolution degradation in space is modeled by a point spread function.

34. The method of claim 33, wherein said spatial point spread function varies within field of views of each of said plurality of input sources.

35. The method of claim 31, wherein the kernel for each of said plurality of input sources is known.

36. The method of claim 33, wherein a spatial point spread function for each of said plurality of sources sequences of images is approximated according to a pre-determined heuristic.

37. The method of claim 33, wherein a spatial point spread function for each of said plurality of sources sequences of images is measured in a pre-calibration step.

38. The method of claim 33, wherein a spatial point spread function for each of said plurality of input sources is approximated according to a real-time calculation.

39. The method of claim 31, wherein resolution degradation in time results from an exposure-time function and modeled by a temporal point spread function.

40. The method of claim 39, wherein a temporal spread function of each of said plurality of input sources is known.

41. The method of claim 39, wherein said temporal spread function is determined by controlling an exposure time for each of said plurality of input sources.

42. The method of claim 39, wherein said temporal spread function is approximated according to data from each of said plurality of input sources.

43. A method for increasing at least one aspect of the resolution, in time and/or space, of a space-time visual entity, comprising:

provide space-time visual entities from a plurality of input sources at one or more respective first resolutions, at least one of said plurality of input sources comprising a sequence of space-time visual entities; and combining information from said plurality of input sources to produce an output sequence of space-time visual entities at a second resolution higher than at least one of said plurality of first level resolutions;

wherein said visual space-time entities are input image sequences and the relation between the said input image sequences and the second resolution of said output sequence is expressed as an integral equation that, comprises:

$$S_i^l(p_i^l) = (S * B_i^h)(p^h) = \iiint_{\substack{P=(x,y,t)\in\text{Support}(B_i^h)}} S(p) B_i^h(p - p^h) dp$$

and wherein the method further comprises solving said integral equation.

44. A method for increasing at least one aspect of the resolution, in time and/or space, of a space-time visual entity, comprising:

providing space-time visual entities from a plurality of input sources at one or more respective first resolutions, at least one of said plurality of input sources comprising a sequence of space-time visual entities; and combining information from said plurality of input sources to produce an output sequence of space-time visual entities at a second resolution higher than at least one of said plurality of first level resolutions;

wherein said visual space-time entities are input image sequences and the relation between the said input image sequences and the second resolution of said output sequence is expressed as an integral equations, wherein said visual space-time entities comprise a plurality of input image sequences and said solving said integral equation further comprises constructing a set of equations simulating said integral equation and solving said set of equations, where unknowns for said set of equations comprise an output sequence of images, wherein said combining said information from said plurality of sources of sequences of images further comprises:

solving a linear set of equations:

$$A\vec{h} = \vec{l}$$

wherein $\vec{h}$ is a vector containing color values for said sequences of images having an adjusted resolution, $\vec{l}$ is a vector containing spatial and temporal measurements for said plurality of sources of sequences of images, and matrix A contains relative contributions of each space-time point of said sequences of images having said adjusted resolution to each space-time point from said plurality of sources of sequences of images.

45. A method for increasing at least one aspect of the resolution, in time and/or space, of a space-time visual entity, comprising:

providing space-time visual entities from a plurality of input sources at one or more respective first resolutions, at least one of said plurality of input sources comprising a sequence of space-time visual entities; and combining information from said plurality of input sources to produce an output sequence of space-time visual entities at a second resolution higher than at least one of said plurality of first level resolutions;

wherein said visual space-time entities are input image sequences and the relation between the said input image sequences and the second resolution of said output sequence is expressed as an integral equation, and wherein the method further comprises solving said integral equation, wherein said equations further comprise a regularization term, said space-time regularization term further comprises a directional regularization term according to $$\min\left( \|A\vec{h} - \vec{l}\|^2 + \|W_x L_x \vec{h}\|^2 + \|W_y L_y \vec{h}\|^2 + \|W_t L_t \vec{h}\|^2 \right).$$

46. A method for treating a visual artifact appearing in a plurality of sequences of images by decreasing exposure time of said sequences, comprising:

receiving a plurality of input sequences of images including said visual artifact, each one of said input sequences being an output depicting a common scene of a different sensor having a respective first exposure time;

combining information from said input sequences of said different sensors to produce an output sequence comprising a sequence of images having a second quality; and using said combining to decrease effective exposure time of said video sequence relative to said first exposure times thereby to treat said visual artifact.

47. The method of claim 46, wherein said visual artifact comprises motion blur.

* * * * *

UNITED STATES PATENT AND TRADEMARK OFFICE
CERTIFICATE OF CORRECTION

PATENT NO. : 7,428,019 B2
APPLICATION NO. : 10/498345
DATED : September 23, 2008
INVENTOR(S) : Michal Irani et al.

It is certified that error appears in the above-identified patent and that said Letters Patent is hereby corrected as shown below:

In the Drawings:

Please replace Figs. 1 and 2 with the attached Figs. 1a, 1b and 2.

Signed and Sealed this

Ninth Day of December, 2008

JON W. DUDAS
*Director of the United States Patent and Trademark Office*